US009307121B2

(12) United States Patent
Sugiyama

(10) Patent No.: US 9,307,121 B2
(45) Date of Patent: Apr. 5, 2016

(54) CONVERSION CIRCUIT, IMAGE PROCESSING DEVICE, AND CONVERSION METHOD THAT PERFORM A/D CONVERSION OF AN IMAGE SIGNAL

(71) Applicant: Sony Corporation, Tokyo (JP)

(72) Inventor: Satoshi Sugiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/153,285

(22) Filed: Jan. 13, 2014

(65) Prior Publication Data

US 2014/0204269 A1 Jul. 24, 2014

(30) Foreign Application Priority Data

Jan. 21, 2013 (JP) ................. 2013-008256

(51) Int. Cl.
*H04N 9/475* (2006.01)
*H04N 5/06* (2006.01)

(52) U.S. Cl.
CPC ....................... *H04N 5/06* (2013.01)

(58) Field of Classification Search
CPC ....................................................... H04N 5/14
USPC ................. 348/512, 521, 682, 516, 445, 511
See application file for complete search history.

(56) References Cited

U.S. PATENT DOCUMENTS

| 5,917,461 | A | * | 6/1999 | Sakami | G09G 3/3611 345/213 |
| 6,118,486 | A | * | 9/2000 | Reitmeier | G06T 7/2013 348/435.1 |
| 6,304,253 | B1 | * | 10/2001 | Sung | G09G 5/006 345/212 |
| 6,522,365 | B1 | * | 2/2003 | Levantovsky | H04N 5/126 348/536 |
| 2005/0140698 | A1 | * | 6/2005 | Tseng | G09G 5/005 345/661 |
| 2006/0114275 | A1 | * | 6/2006 | Kim | G09G 5/005 345/698 |
| 2006/0274207 | A1 | * | 12/2006 | Hayden | G09G 5/008 348/572 |
| 2007/0097263 | A1 | * | 5/2007 | Kim | 348/521 |
| 2007/0222893 | A1 | * | 9/2007 | Mori | H03M 1/1255 348/572 |
| 2009/0161986 | A1 | * | 6/2009 | Kuo | H03L 7/0814 382/276 |
| 2009/0225197 | A1 | * | 9/2009 | Takahashi | G06T 3/4007 348/240.2 |
| 2010/0141613 | A1 | * | 6/2010 | Sonobe | G09G 5/18 345/204 |
| 2011/0043700 | A1 | * | 2/2011 | Ouyang | G09G 5/008 348/572 |
| 2012/0188448 | A1 | * | 7/2012 | Kimura | 348/521 |

FOREIGN PATENT DOCUMENTS

JP 2009-003240 1/2009

* cited by examiner

*Primary Examiner* — Jefferey Harold
*Assistant Examiner* — Humam Satti
(74) *Attorney, Agent, or Firm* — Wolf, Greenfield & Sacks, P.C.

(57) ABSTRACT

A conversion circuit includes: a conversion section configured to convert each of analog pixel signals into digital pixel data; a timing acquisition section configured to acquire specified timing, in which the specified timing defines a display period during which display of each of the analog pixel signals is performed in a cycle of a synchronization signal; a timing setting section configured to set timing that defines an extension period that is longer than the display period, in which the timing is other than the specified timing; an enable signal generation section configured to generate an enable signal, in which the enable signal indicates the extension period as a period during which the digital pixel data is valid; and an output section configured to output the digital pixel data that is valid, in accordance with the enable signal.

9 Claims, 19 Drawing Sheets

234

| HORIZONTAL SYNCHRONI-ZATION FREQUENCY Hsf (kHz) | VERTICAL SYNCHRONI-ZATION FREQUENCY Vsf (Hz) | FORMAT | | | |
|---|---|---|---|---|---|
| | | FORMAT CODE | HORIZONTAL RESOLUTION (Pixel) | VERTICAL RESOLUTION (Line) | SCANNING SYSTEM |
| 31.469 | 59.940 | 1 | 640 | 480 | PROGRESSIVE |
| ⋮ | ⋮ | ⋮ | ⋮ | ⋮ | ⋮ |
| 33.716 | 59.940 | 5 | 1920 | 1080 | INTERLACE |
| ⋮ | ⋮ | ⋮ | ⋮ | ⋮ | ⋮ |
| 37.750 | 50.000 | 19 | 1280 | 720 | PROGRESSIVE |
| 28.125 | 50.000 | 20 | 1920 | 1080 | INTERLACE |
| ⋮ | ⋮ | ⋮ | ⋮ | ⋮ | ⋮ |

| SIGNAL QUALITY | CORRECTION AMOUNT C1 |
|---|---|
| HIGH | 0 |
| MIDDLE | +2 |
| LOW | +4 |

| FORMAT CODE | CORREC-TION AMOUNT Ct | TIMING PARAMETER | | | | | |
|---|---|---|---|---|---|---|---|
| | | HORIZONTAL FRONT PORCH Hfront (Pixel) | HORIZONTAL PULSE WIDTH Hpw (Pixel) | HORIZONTAL BACK PORCH Hback (Pixel) | VERTICAL FRONT PORCH Vfront (Line) | VERTICAL PULSE WIDTH Vpw (Line) | VERTICAL BACK PORCH Vback (Line) |
| 1 | 0 | 16 | 96 | 48 | 10 | 2 | 33 |
| | 1 | 18 | 94 | 47 | 10 | 2 | 32 |
| | 2 | 20 | 92 | 46 | 11 | 1 | 30 |
| | ⋮ | ⋮ | ⋮ | ⋮ | ⋮ | ⋮ | ⋮ |
| 2 | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

| Bit / Byte | 7 | 6 | 5 | 4 | 3 | 2 | 1 | 0 |
|---|---|---|---|---|---|---|---|---|
| SB0 | 0 | 0 | 0 | Clear_AVMUTE | 0 | 0 | 0 | Set_AVMUTE |
| SB1 | PP3 | PP2 | PP1 | PP0 | CD3 | CD2 | CD1 | CD0 |
| SB2 | 0 | 0 | 0 | 0 | 0 | 0 | 0 | Default_Phase |
| SB3 | 0 | 0 | 0 | 0 | 0 | 0 | 0 | 0 |
| SB4 | 0 | 0 | 0 | 0 | 0 | 0 | 0 | 0 |
| SB5 | 0 | 0 | 0 | 0 | 0 | 0 | 0 | 0 |
| SB6 | 0 | 0 | 0 | 0 | 0 | 0 | 0 | 0 |

FIG. 19

CONVERSION CIRCUIT, IMAGE PROCESSING DEVICE, AND CONVERSION METHOD THAT PERFORM A/D CONVERSION OF AN IMAGE SIGNAL

CROSS REFERENCE TO RELATED APPLICATIONS

This application claims the benefit of Japanese Priority Patent Application JP 2013-8256 filed Jan. 21, 2013, the entire contents of which are incorporated herein by reference.

BACKGROUND

The present technology relates to a conversion circuit, an image processing device, and a conversion method. More particularly, the present technology relates to a conversion circuit, an image processing device, and a conversion method that perform A/D conversion on an image signal.

Typically, when converting an analog image signal into digital pixel data to process an image, an image processing device takes (namely, captures) valid pixel data to process an image on the basis of a synchronization signal. Specifically, the image processing device receives a synchronization signal together with an image signal, and acquires a video data period in a cycle of the synchronization signal in accordance with a standard such as CEA (Consumer Electronics Association)-861-E. The image processing device captures, as a valid pixel signal, a pixel signal in the video data period. Further, the image processing device performs image processing such as a contrast correction or noise reduction with respect to an image including the captured pixel signals and outputs the thus-processed image to a display device, etc. (for example, see Japanese Unexamined Patent Application Publication No. 2009-3240).

SUMMARY

However, there is a possibility that in the above-described existing technology, image processing is not performed in a part of an image. For example, when signal quality of an analog pixel signal or an analog synchronization signal is low, a video data period to be obtained from the synchronization signal may fail to be matched with a period in which a valid pixel signal is inputted to an image processing device. In this case, there is a possibility that a valid pixel signal within a blanking period outside the video data period is inputted to the image processing device. When a valid image signal is inputted to the blanking period, the image processing device performs image processing without capturing the valid pixel signal. As a result, there is an issue that the image processing is not performed in a part of the valid pixel signal, and a part of an image after the image processing is omitted.

It is desirable to prevent image processing from failing to be performed in a part of an image.

According to an embodiment of the present technology, there is provided a conversion circuit, including: a conversion section configured to convert each of analog pixel signals into digital pixel data; a timing acquisition section configured to acquire specified timing, the specified timing defining a display period during which display of each of the analog pixel signals is performed in a cycle of a synchronization signal; a timing setting section configured to set timing that defines an extension period that is longer than the display period, the timing being other than the specified timing; an enable signal generation section configured to generate an enable signal, the enable signal indicating the extension period as a period during which the digital pixel data is valid; and an output section configured to output the digital pixel data that is valid, in accordance with the enable signal. Thereby, an action is brought out that the valid digital pixel data is outputted in accordance with the enable signal that indicates the extension period as the period in which the digital pixel data is valid.

According to an embodiment of the present technology, there is provided a method of controlling a conversion circuit, the method including: converting, through a conversion section, each of analog pixel signals into digital pixel data; acquiring, through a timing acquisition section, specified timing, the specified timing defining a display period during which display of each of the analog pixel signals is performed in a cycle of a synchronization signal; setting, through a timing setting section, timing that defines an extension period that is longer than the display period, the timing being other than the specified timing; generating, through an enable signal generation section, an enable signal, the enable signal indicating the extension period as a period during which the digital pixel data is valid; and outputting, through an output section, the digital pixel data that is valid, in accordance with the enable signal. Thereby, an action is brought out that the valid digital pixel data is outputted in accordance with the enable signal that indicates the extension period as the period in which the digital pixel data is valid.

According to an embodiment of the present technology, there is provided an image processing device, including: a conversion section configured to convert each of analog pixel signals into digital pixel data; a timing acquisition section configured to acquire specified timing, the specified timing defining a display period during which display of each of the analog pixel signals is performed in a cycle of a synchronization signal; a timing setting section configured to set timing that defines an extension period that is longer than the display period, the timing being other than the specified timing; an enable signal generation section configured to generate an enable signal, the enable signal indicating the extension period as a period during which the digital pixel data is valid; an output section configured to output the digital pixel data that is valid, in accordance with the enable signal; and an image processing section configured to perform predetermined image processing on the digital pixel data that is outputted. Thereby, an action is brought out that the valid digital pixel data is outputted in accordance with the enable signal that indicates the extension period as the period in which the digital pixel data is valid, and the image processing is performed thereon.

Advantageously, a signal quality measuring section configured to measure signal quality of the synchronization signal may be further included, and the timing setting section may set the timing that defines the longer extension period as the signal quality is lower. Thereby, an action is brought out that as the signal quality is lower, the display period is made longer.

Advantageously, a regeneration stop signal generation section configured to generate a regeneration stop signal may be further included. The regeneration stop signal may instruct stop of regeneration of the digital pixel data when the signal quality is lower than a predetermined value, and the output section may further output the regeneration stop signal. Thereby, an action is brought out that when the signal quality is lower than the predetermined value, the regeneration stop signal indicating the regeneration stop of the digital pixel data is generated and outputted.

Advantageously, the timing setting section may acquire resolution of an image that is structured by the analog pixel signals, and may set the timing that defines the longer extension period as the resolution is lower. Thereby, an action is brought out that as the resolution is lower, the display period is made longer.

Advantageously, the timing acquisition section may acquire the specified timing, based on a specified pulse width that is specified as a pulse width of the synchronization signal, and the timing setting section may set the timing that defines the extension period, based on a pulse width that is different from the specified pulse width. Thereby, an action is brought out that the timing defining the extension period is set, based on the pulse width different from the specified pulse width.

Advantageously, the timing acquisition section may acquire the specified timing, based on a specified back porch, the specified back porch being specified as a period from a time point at which the synchronization signal changes up to timing at which the display period starts, and the timing setting section may set the timing that defines the extension period, based on a period that is different from the specified back porch. Thereby, an action is brought out that the timing defining the extension period is set, based on the period different from the specified back porch.

Advantageously, the timing acquisition section may acquire the specified timing, based on a specified front porch, the specified front porch being specified as a period from timing at which the display period ends up to a time point at which the synchronization signal changes, and the timing setting section may set the timing that defines the extension period, based on a period that is different from the specified front porch. Thereby, an action is brought out that the timing defining the extension period is set, based on the period different from the specified front porch.

According to the above-described embodiments of the present technology, an unexpected result is exerted that the image processing is prevented from failing to be performed in a part of an image.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 4 illustrates one example of a format determination table according to the first embodiment.

FIG. 6 illustrates one example of a signal quality reference correction amount table according to the first embodiment.

FIG. 8 illustrates one example of a timing parameter table according to the first embodiment.

FIG. 19 illustrates one example of a data configuration of a data island packet according to the second embodiment.

DETAILED DESCRIPTION

Hereinafter, some embodiments for performing the present technology (hereinafter, referred to as an embodiment) are described. The description will be given in the following order.

1. First Embodiment (an example where a video data period is extended to output a pixel signal)
2. Second Embodiment (an example where a video data period is extended to output a pixel signal and a regeneration stop signal)

1. First Embodiment

[Configuration Example of Image Processing System]

Figure 1:
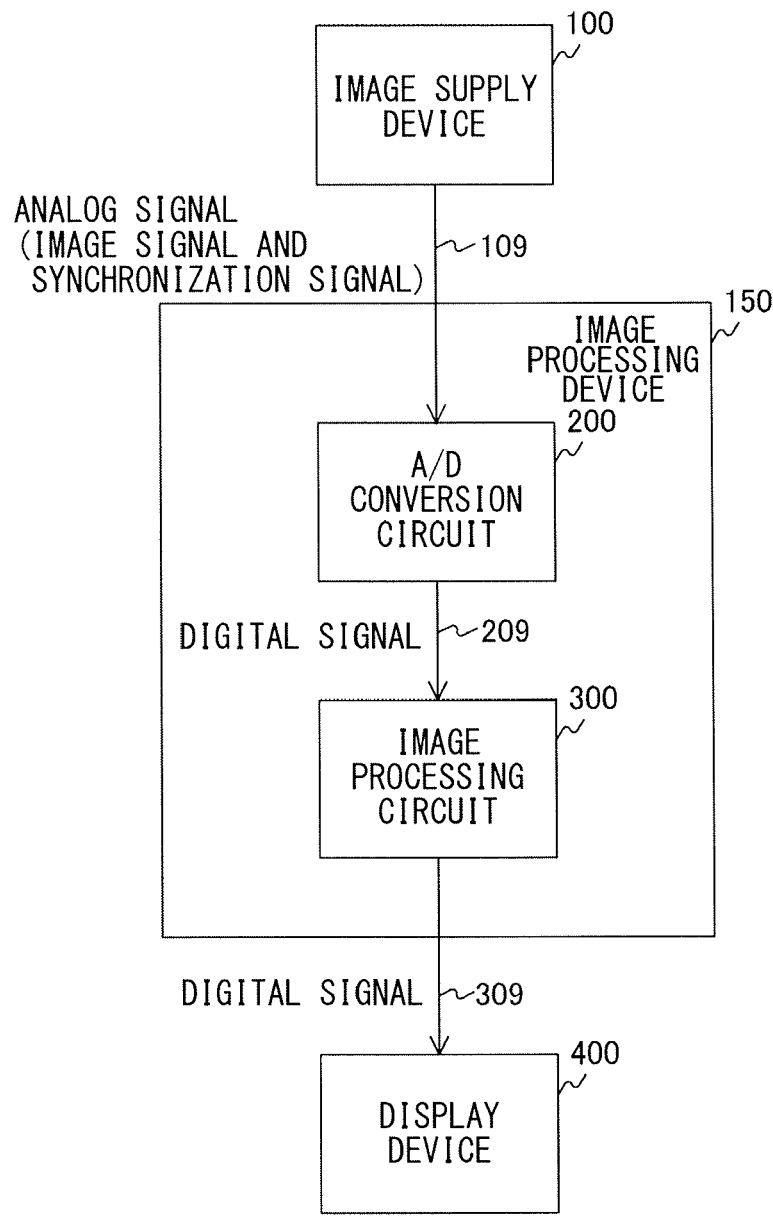
FIG. 1 is an overall view illustrating one configuration example of an image processing system according to a first embodiment.

FIG. 1 is an overall view illustrating one configuration example of an image processing system according to an embodiment. The image processing system includes an image supply device 100, an image processing device 150, and a display device 400.

The image supply device 100 supplies an analog signal including an image signal and a synchronization signal to the image processing device 150 via a signal line 109. The image supply device 100 may supply, for example, a component picture signal as an analog signal. The image supply device 100 may supply a signal other than the component picture signal, as long as the signal is the analog signal that includes the image signal and the synchronization signal. For example, the image supply device 100 may supply a composite picture signal in place of the component picture signal, or may supply an RF (Radio Frequency) signal to which broadcast data is added. Further, the image supply device 100 may supply an analog signal including an analog audio signal in addition to the analog image signal and the analog synchronization signal.

The image processing device 150 converts an image signal into digital data (hereinafter, referred to as "image data"), and performs predetermined image processing. The image processing device 150 includes an A/D (analog to digital) conversion circuit 200 and an image processing circuit 300. Further, the image data includes a plurality of pixel data, the number of which corresponds to the resolution.

The A/D conversion circuit 200 converts the analog image signal and the analog synchronization signal into the digital data. In a cycle of the synchronization signal, the A/D conversion circuit 200 acquires timing of a start and timing of an end of a period during which an image is displayed. Further, the A/D conversion circuit 200 supplies, to the image processing circuit 300 via an HDMI cable 209, pixel data in that period as valid pixel data. The A/D conversion circuit 200 is one example of a conversion circuit according to one embodiment of the present technology.

The image processing circuit 300 performs predetermined image processing on the image data that includes the valid pixel data. The image processing to be performed may be, for example, at least one of a noise reduction process, a change process of a compression format, a gamma correction process, a contrast adjustment process, a decoding process of broadcast data, etc. The image processing circuit 300 outputs to the display device 400 via a signal line 309 a digital signal to which image data after the process is added. Here, the image processing circuit 300 is one example of an image processing section according to one embodiment of the present technology.

The display device 400 displays the image data after the image processing.

[Configuration Example of A/D Conversion Circuit]

Figure 2:
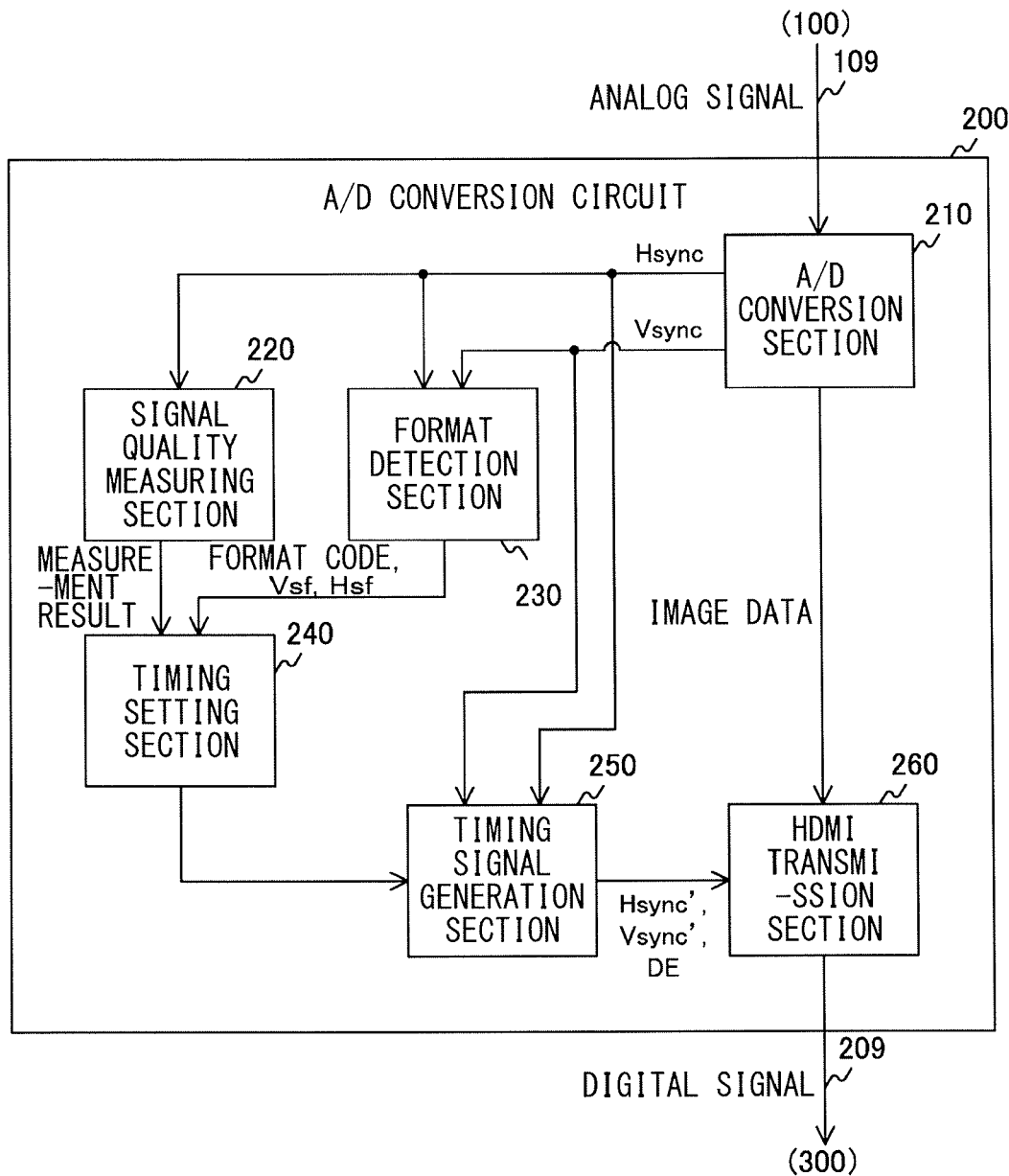
FIG. 2 illustrates one configuration example of an A/D conversion circuit according to the first embodiment.

FIG. 2 is a block diagram illustrating one configuration example of the A/D conversion circuit 200 according to the first embodiment. The A/D conversion circuit 200 includes an A/D conversion section 210, a signal quality measuring section 220, a format detection section 230, a timing setting section 240, a timing signal generation section 250, and an HDMI transmission section 260.

The A/D conversion section 210 converts the analog image signal and the analog synchronization signal into the digital data. The synchronization signal includes a vertical synchronization signal Vsync indicating scan timing in the vertical direction and a horizontal synchronization signal Hsync indicating scan timing in the horizontal direction. The A/D conversion section 210 supplies the A/D converted horizontal synchronization signal Hsync to the signal quality measuring section 220, the format detection section 230, and the timing signal generation section 250. Further, the A/D conversion section 210 supplies the A/D converted vertical synchronization signal V sync to the format detection section 230 and the timing signal generation section 250. In addition, the A/D conversion section 210 supplies the image data to the HDMI transmission section 260. Here, the A/D conversion section 210 is one example of a conversion section according to one embodiment of the present technology.

The signal quality measuring section 220 measures signal quality of the synchronization signal. For example, the signal quality measuring section 220 may receive the horizontal synchronization signal Hsync, and detect each of the scan timings of the horizontal synchronization signal Hsync. Further, each time the scan timing is detected, the signal quality measuring section 220 measures a time from the previous scan timing up to the current scan timing as a cycle of the horizontal synchronization signal Hsync. The signal quality measuring section 220 obtains a difference between the previous cycle and the current cycle each time the period is measured, and determines that as the difference is larger, signal quality is lower. Further, the signal quality measuring section 220 supplies a measurement result indicating a level of the signal quality to the timing setting section 240.

In addition, the signal quality measuring section 220 measures the signal quality of the synchronization signal, and may also measure the signal quality of the analog signal. In this case, for example, the signal quality measuring section 220 may measure a signal level of the analog signal, and determines that as the signal level is higher, the signal quality is higher.

The format detection section 230 detects a format of the resolution of the image data. In standards including CEA-861-E, timings that define particular occasions, such as timing of a start and timing of an end, are specified for each period of the blanking period and the video data period, for each format of the resolution. Accordingly, by detecting the format of the resolution, the timings defining the particular occasions of the video data period are acquired.

Here, the blanking period is a period from a time point at which a scanning line on a screen of the display device is formed up to a time point at which transition to the next scanning line is made, or a period from a time point at which a raster is formed up to a time point at which transition to the next raster is made. The former period is referred to as a "horizontal blanking period", and the latter period is referred to as a "vertical blanking period". The blanking periods are also periods in which an image is not displayed on the display device. On the other hand, the video data period is a period excluding the blanking period in the cycle of the synchronization signal, and also a period in which an image is displayed on the display device. Hereinafter, the video data period in the cycle of the vertical synchronization signal Vsync is referred to as a "vertical video data period", and the video data period in the cycle of the horizontal synchronization signal Hsync is referred to as a "horizontal video data period".

In the standard of CEA-861-E, a blanking period is specified as a period including a front porch, a pulse width of a synchronization signal, and a back porch. Each of the front porch, the pulse width of the synchronization signal, and the back porch is referred to as a "timing parameter". The front porch indicates a period from timing at which the previous video data period ends to timing at which the synchronization signal varies. The back porch indicates a period from timing at which the periods of the front porch and the pulse width have elapsed up to timing at which the video data period starts.

The front porch, the pulse width of the horizontal synchronization signal, and the back porch in the horizontal blanking period are hereinafter referred to as a "horizontal front porch", a "horizontal pulse width", and a "horizontal back porch", respectively. On the other hand, the front porch, the pulse width of the vertical synchronization signal, and the back porch in the vertical blanking period are hereinafter referred to as a "vertical front porch", a "vertical pulse width", and a "vertical back porch", respectively.

As a unit of length of each of the horizontal front porch, the horizontal pulse width, and the horizontal back porch, for example, the number of clocks of a pixel clock signal used to transmit each of the pixel data, or the number of pixels may be used. Further, as a unit of length of each of the vertical front porch, the vertical pulse width, and the vertical back porch, for example, the number of clocks or the number of lines of the vertical synchronization signal Vsync may be used.

The format detection section 230 measures a frequency of the horizontal synchronization signal Hsync as a horizontal synchronization frequency Hsf, and measures a frequency of the vertical synchronization signal Vsync as a vertical synchronization frequency Vsf. For example, these frequencies may be obtained by measuring cycles of the synchronization signals (Hsync and Vsync) and calculating inverse numbers of the measured values. For each combination of respective frequencies of the horizontal synchronization signal Hsync and the vertical synchronization signal Vsync, the format detection section 230 preliminarily stores a table with which a format of the resolution is associated. With reference to the above table, the format detection section 230 detects a format corresponding to a combination of the measured frequencies. The format detection section 230 supplies a format code being information for specifying the detected format, the horizontal synchronization frequency Hsf, and the vertical synchronization frequency Vsf to the timing setting section 240.

Here, the format detection section 230 is one example of a timing acquisition section according to one embodiment of the present technology.

The timing setting section 240 sets timing other than the specified timing to extend the video data period. On the basis of the format and the signal quality, the timing setting section 240 changes timing of one or both of a start and an end of the video data period to timing different from the specified timing indicated by the format code. Specifically, as the signal quality is lower or the resolution of the format is lower, the timing setting section 240 so changes the timing as to extend the video data period longer. The timing setting section 240 supplies a control signal indicating timing after the change to the timing signal generation section 250.

The timing signal generation section 250 generates a timing signal in accordance with the control signal. The timing signal includes the synchronization signal and a data enable signal. The data enable signal indicates the video data period as a period in which the pixel data is valid. In the video data period, for example, the data enable signal may be set to a high level. In accordance with the control signal, the timing signal generation section 250 regenerates the synchronization signal (Hsync' and Vsync'), and generates the data enable signal. The timing signal generation section 250 supplies the timing signal (namely, the synchronization signal and the data enable signal) to the HDMI transmission section 260. Here, the timing signal generation section 250 is one example of an enable signal generation section according to one embodiment of the present technology.

The HDMI transmission section 260 generates and transmits a video stream in accordance with the standard of the HDMI. The video stream is data including the image data and the timing signal. The HDMI transmission section 260 acquires the video data period and the blanking period from the data enable signal generated by the timing signal generation section 250. Further, the HDMI transmission section 260 transmits the synchronization signal of the timing signal to the image processing circuit 300 in the blanking period, and transmits the image data to the image processing circuit 300 in the video data period. In addition, the HDMI transmission section 260 generates and transmits a data island packet in the blanking period, on an as-necessary basis.

The HDMI transmission section 260 transmits data by using a TMDS (Transmission Minimized Differential Signaling) system via the HDMI cable. The TMDS system is a system that determines a value of a signal through a potential difference between one pair of signal lines by using three pairs of signal lines for transmitting the pixel data and one pair of signal lines for transmitting the pixel clock signal. Here, the HDMI transmission section 260 is one example of an output section according to one embodiment of the present technology. Note that, the A/D conversion circuit 200 transmits the image signal and the timing signal in accordance with the standard of the HDMI. However, the A/D conversion circuit 200 may transmit the image signal and the timing signal in accordance with a communication standard other than the HDMI standard, as long as the standard is capable of transmitting the image signal and the timing signal.

[Configuration Example of Format Detection Section]

Figure 3:
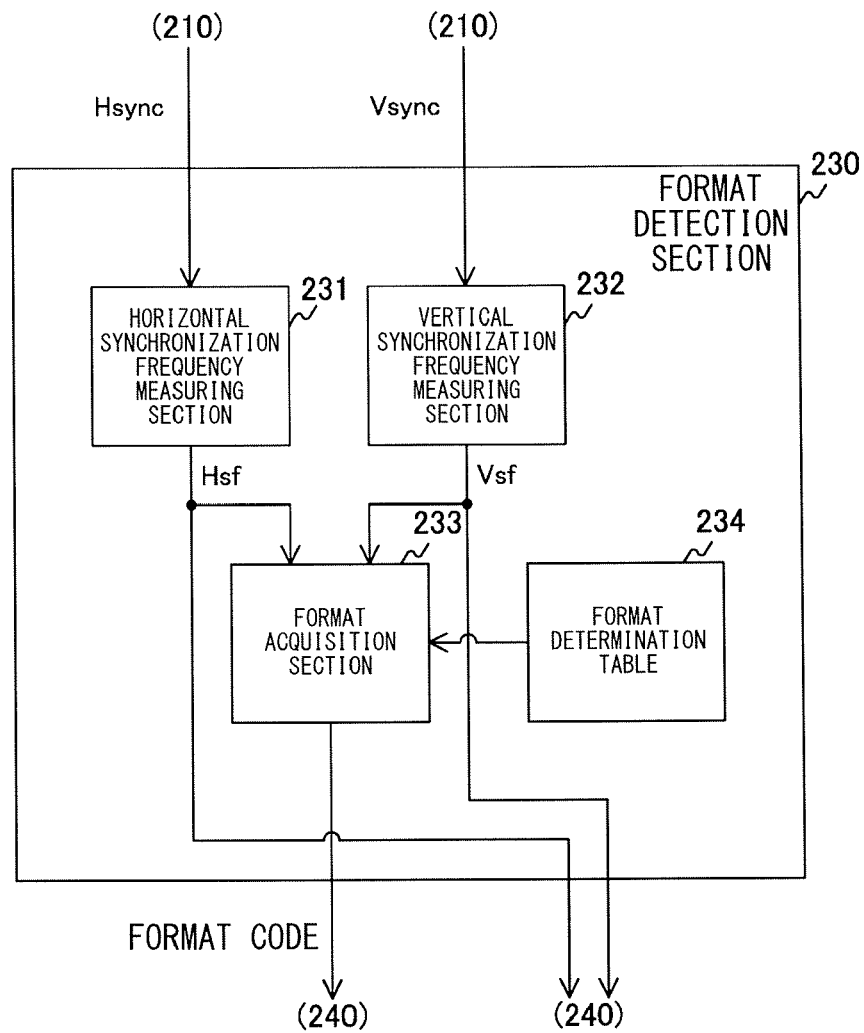
FIG. 3 is a block diagram illustrating one configuration example of a format detection section according to the first embodiment.

FIG. 3 is a block diagram illustrating one configuration example of the format detection section 230 according to the first embodiment. The format detection section 230 includes a horizontal synchronization frequency measuring section 231, a vertical synchronization frequency measuring section 232, a format acquisition section 233, and a format determination table 234.

The horizontal synchronization frequency measuring section 231 measures the horizontal synchronization frequency Hsf. For example, the horizontal synchronization frequency measuring section 231 may detect timing of rise or fall of the horizontal synchronization signal Hsync a plurality of times. Further, the horizontal synchronization frequency measuring section 231 measures, as a cycle, the time from the previous timing up to the current timing, and obtains an inverse number of the cycle as the horizontal synchronization frequency Hsf. When measuring the cycle a plurality of times, the horizontal synchronization frequency measuring section 231 calculates an average, etc. of the measured values as the cycle. The horizontal synchronization frequency measuring section 231 supplies the horizontal synchronization frequency Hsf to the format acquisition section 233 and the timing signal generation section 250.

The vertical synchronization frequency measuring section 232 measures the vertical synchronization frequency Vsf. For example, the vertical synchronization frequency measuring section 232 may measure the vertical synchronization frequency Vsf by using a method similar to that of the horizontal synchronization frequency measuring section 231. The vertical synchronization frequency measuring section 232 supplies the vertical synchronization frequency Vsf to the format acquisition section 233 and the timing signal generation section 250.

The format acquisition section 233 determines a format of the resolution on the basis of the horizontal synchronization frequency Hsf and the vertical synchronization frequency Vsf. The format acquisition section 233 acquires a format code corresponding to a combination of the measured horizontal synchronization frequency Hsf and vertical synchronization frequency Vsf from the format determination table 234. The format acquisition section 233 supplies the read-out format code to the timing setting section 240.

The format determination table 234 is a table that stores the format code in association with each combination of the horizontal synchronization frequency Hsf and the vertical synchronization frequency Vsf.

[Configuration Example of Format Determination Table]

FIG. 4 illustrates one example of the format determination table 234 according to the first embodiment. In the format determination table 234, the format code is described in association with each combination of the horizontal synchronization frequency Hsf and the vertical synchronization frequency Vsf in accordance with a standard such as CEA-861-E. By the format code, for example, a horizontal resolution, a vertical resolution, and a scanning system of the image data may be specified. Here, the scanning system is an interlace system or a progressive system. It is to be noted that, in FIG. 4, the horizontal resolution, the vertical resolution, and the scanning system are described in the format determination table 234 for convenience of explanation. However, the data may not be described in the format determination table 234.

For example, the format code of "1" may be described in association with a combination of the horizontal synchronization frequency Hsf of "31.469" Hz and the vertical synchronization frequency Vsf of "59.940" Hz. The format code of "1" is a code allocated to a format in which the horizontal resolution is "640" pixels, the vertical resolution is "480" lines, and the scanning system is the progressive system.

[Configuration Example of Timing Setting Section]

Figure 5:
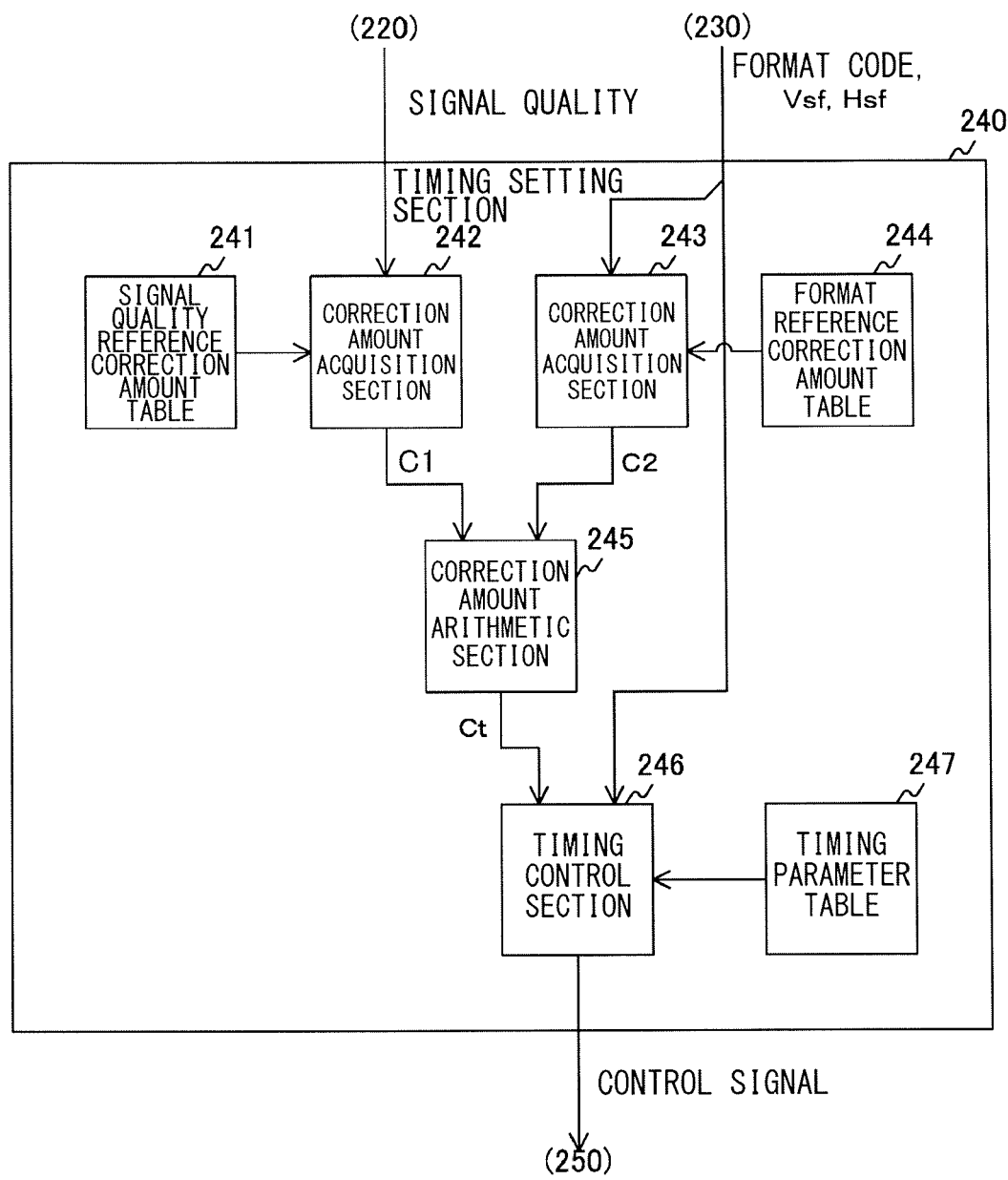
FIG. 5 is a block diagram illustrating one configuration example of a timing setting section according to the first embodiment.

FIG. 5 is a block diagram illustrating one configuration example of the timing setting section 240 according to the first embodiment. The timing setting section 240 includes a signal quality reference correction amount table 241, correction amount acquisition sections 242 and 243, a format reference correction amount table 244, and a correction amount arithmetic section 245. In addition, the timing setting section 240 includes a timing control section 246 and a timing parameter table 247.

The signal quality reference correction amount table 241 is a table in which a correction amount C1 of a timing parameter is associated with each of a plurality of measured values related to the signal quality. For example, as the signal quality is lower, a larger value may be set to the correction amount C1. Further, as the correction amount C1 is larger, the timing parameter is so corrected that the video data period is extended longer. Therefore, as the signal quality is lower, the video data period is longer.

On the basis of the measured value of the signal quality, the correction amount acquisition section 242 acquires the correction amount of the timing parameter. The correction amount acquisition section 242 receives the measured value of the signal quality from the signal quality measuring section 220, and reads out the correction amount C1 corresponding to that measured value from the signal quality reference correction amount table 241. Further, the correction amount acquisition section 242 supplies the read-out correction amount C1 to the correction amount arithmetic section 245.

The format reference correction amount table 244 is a table in which a correction amount C2 of the timing parameter is associated with each of the format codes. For example, as the resolution indicated by the format is lower, a larger value may be set to the correction amount C2. Further, as the correction amount C2 is larger, the timing parameter is so corrected that the video data period is extended longer. Therefore, as the resolution is lower, the video data period is longer.

On the basis of the format of the resolution, the correction amount acquisition section 243 acquires the correction amount C2 of the timing parameter. The correction amount acquisition section 243 receives the format code from the format detection section 230, and reads out the correction amount C2 corresponding to that format code from the format reference correction amount table 244. Further, the correction amount acquisition section 243 supplies the read-out correction amount C2 to the correction amount arithmetic section 245.

On the basis of the correction amount C1 and C2, the correction amount arithmetic section 245 calculates a final correction amount Ct of the timing parameter.

A value larger than or equal to zero is set to the correction amount Ct, and as the correction amount Ct is larger, the timing parameter is so corrected that the video data period is extended longer. For example, the horizontal video data period may be extended as much as the number of pixels having the same number as that of the correction amount Ct. Further, the vertical video data period may be extended as much as the number of lines having the same number as that of the correction amount Ct.

The correction amount arithmetic section 245 may calculate the correction amount Ct, for example, with the use of the following expression. The correction amount arithmetic section 245 supplies the calculated correction amount Ct to the timing control section 246.

$$Ct = w1 \times C1 + w2 \times C2 \qquad \text{expression 1}$$

In the expression 1, w1 and w2 are weighting coefficients of the correction amount C1 and C2, and predetermined real numbers are set thereto.

The timing parameter table 247 is a table in which the timing parameter is associated with each combination of the format code and the correction amount Ct. The timing parameter includes a horizontal front porch Hfront, a horizontal pulse width Hpw, a horizontal back porch Hback, a vertical front porch Vfront, a vertical pulse width Vpw, and a vertical back porch Vback. Here, the timing parameter corresponding to the correction amount Ct of "0" is a parameter of a specified value specified by a standard such as CEA-861-E. On the other hand, the timing parameter corresponding to the correction amount Ct of a value other than "0" is a parameter resulting from correcting, on the basis of the correction amount Ct, the specified value specified by the standard such as CEA-861-E. One or both of the pulse width and the back porch is corrected to a value that is smaller as the correction amount is larger. On the other hand, if a period of the front porch is too short, the horizontal synchronization signal Hsync may rise up in the period in which the data enable signal is active. In this case, there is a possibility that an image is not normally transmitted. Therefore, the period of the front porch may be desirably made smaller in the correction amount than those of the back porch and the pulse width. Further, the period of the front porch may be extended within a range in which the video data period is not longer than that before the correction.

On the basis of the format code and the correction amount Ct, the timing control section 246 generates a control signal for controlling timing of one or both of a start and an end of the video data period. The timing control section 246 receives the format code and the correction amount Ct from the correction amount arithmetic section 245 and the format detection section 230. Further, the timing control section 246 reads out the timing parameter corresponding to the combination of the received format code and correction amount Ct from the timing parameter table 247. On the basis of the read-out timing parameter, the timing control section 246 generates the control signal. Specifically, the control signal includes a pulse width control signal for controlling a pulse width and a data enable control signal for controlling a data enable control signal. The pulse width control signal indicates a pulse width after the change, or a change amount of the pulse width. Further, the pulse width control signal includes a signal that controls one or both of the horizontal pulse width Hpw and the vertical pulse width Vpw.

The data enable control signal controls timing of the start and timing of the end in a period in which a data enable signal DE is active. For example, the data enable control signal may indicate, as the timing of the start, timing at which the back porch has elapsed after a time point at which the synchronization signal (Hsync or Vsync) has changed. Further, the data enable control signal indicates, as timing at which the data enable signal DE is inactive, timing at which the video data period has elapsed after a time point at which the data enable signal DE has changed to active. Here, the data enable signal DE is active at the time of a high level, and inactive at the time of a low level. Further, a length of the video data period is obtained by the timing control section 246 through calculating a value that results from subtracting lengths of the front porch, the pulse width, and the back porch from a length of the cycle of the synchronization signal. The data enable control signal supplies the generated control signal to the timing signal generation section 250.

The timing setting section 240 may directly use any one of the correction amount C1 and C2 as the correction amount Ct. In this case, a combination of the signal quality reference correction amount table 241 and the correction amount acquisition section 242, or a combination of the correction amount acquisition section 243 and the format reference correction amount table 244 is unnecessary, and the correction amount arithmetic section 245 is also unnecessary. The correction amount arithmetic section 245 may separately obtain the correction amount of the vertical video data period and the correction amount of the horizontal video data period. Further, the correction amount arithmetic section 245 may obtain only any one of the correction amount of the vertical video data period and the correction amount of the horizontal video data period. Further, the data enable signal DE may be active at the time of a low level, and inactive at the time of a high level.

[Configuration Example of Signal Quality Reference Correction Amount Table]

FIG. 6 illustrates one example of the signal quality reference correction amount table 241 according to the first embodiment. A level of the signal quality, for example, may be classified into three stages of "high", "middle", and "low", and the correction amount C1 is stored in association with each level of the signal quality. For example, as the signal quality is lower, a larger value may be set to the correction amount C1 and the video data period may be made longer. Specifically, when a level of the signal quality is "high", the correction amount C1 of "0" is set. When a level of the signal quality is "middle", the correction amount C1 of "+2" is set. Further, when a level of the signal quality is "low", the correction amount C1 of "+4" is set

[Configuration Example of Format Reference Correction Amount Table]

Figure 7:
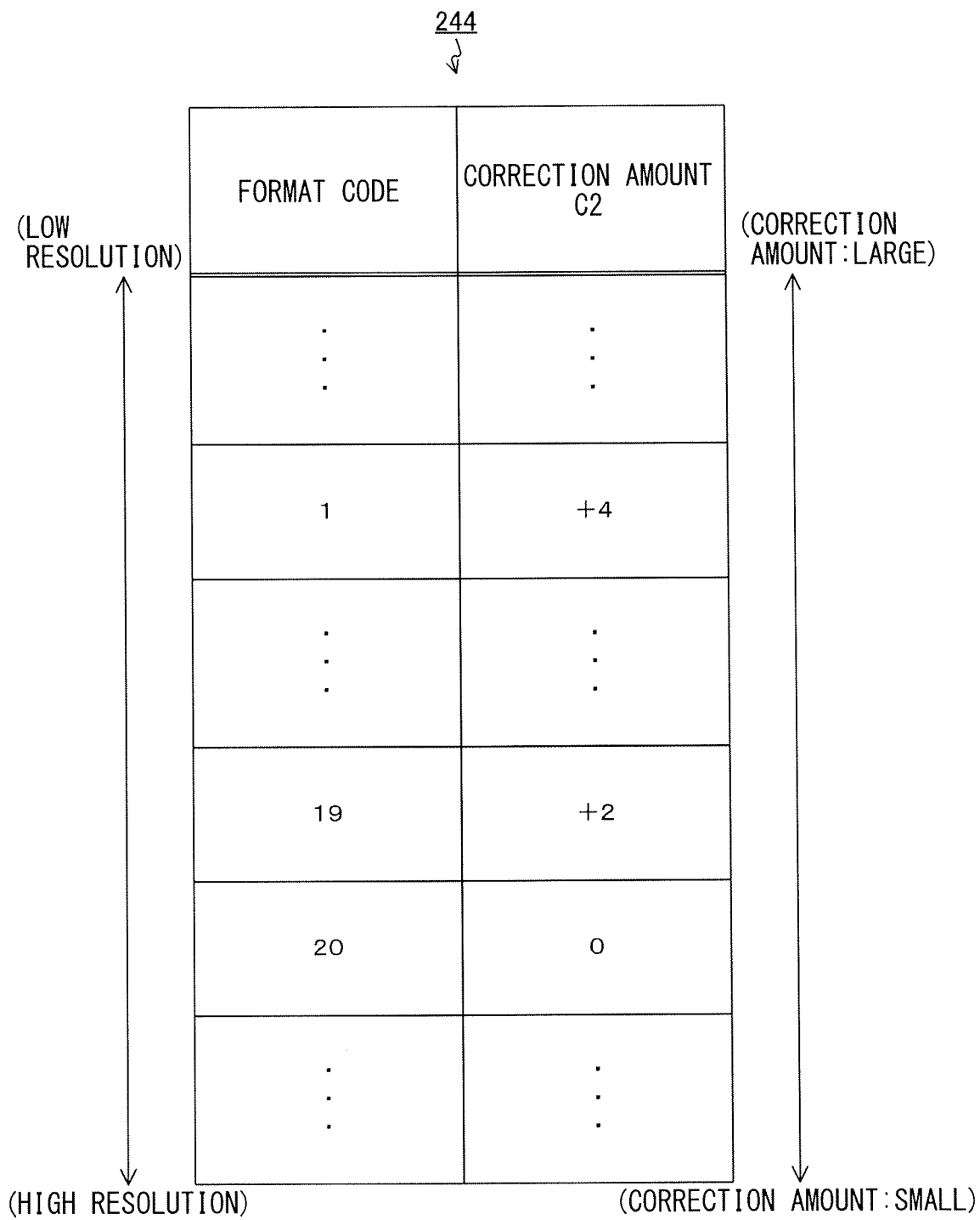
FIG. 7 illustrates one example of a format reference correction amount table according to the first embodiment.

FIG. 7 illustrates one example of the format reference correction amount table 244 according to the first embodiment. In the format reference correction amount table 244, the correction amount C2 is described for each format code of the resolution. For example, as the resolution is lower, a larger value may be set to the correction amount C2 and the video data period may be made longer. Specifically, when the format code is "1" that indicates a format of the relatively low resolution, the correction amount C2 of "+4" is set. On the other hand, when the format code is "20" that indicates a format of the relatively high resolution, the correction amount C2 of "0" is set.

[Configuration Example of Timing Parameter Table]

FIG. 8 illustrates one example of the timing parameter table 247 according to the first embodiment. In the timing parameter table 247, the timing parameter is stored in association with each combination of the format code and the correction amount Ct. Examples of the timing parameter may include the horizontal front porch, the horizontal pulse width, the horizontal back porch, the vertical front porch, the vertical pulse width, and the vertical back porch.

To the correction amount Ct, a value larger than or equal to 0 is set. The timing parameter at the time when the correction amount Ct is "0" is a specified value specified by the format code. Further, the timing parameter at the time when the correction amount Ct is larger than "0" is a parameter of a value that is so changed from the specified value that the video data period is extended. Specifically, as the correction amount Ct is larger, the timing parameter of a smaller value is set. The front porch may preferably be not shorter than the specified value. One reason is that when the front porch is too short, the horizontal synchronization signal Hsync may rise up in the period in which the data enable signal is active. As a result, an image may fail to be normally transmitted.

In particular, when a pitch width is made wide in the A/D conversion circuit 200, the front porch may become smaller than the specified value specified by the format code. Therefore, by correcting the front porch to a value that is larger than the specified value, resistance to an adjustment of the pitch width is improved. However, even when the front porch is made long, one or both of the pulse width and the back porch may be shortened accordingly to secure the video data period that is longer than the specified value.

Here, an example is given where the format code is "1" and the correction amount Ct is "0". In this case, the specified value specified by a format indicated by the format code is set to the timing parameter. Specifically, the horizontal front porch Hfront of "16" pixels, the horizontal pulse width Hpw of "96" pixels, and the horizontal back porch Hback of "48" pixels are set. Further, the vertical front porch Vfront of "10" lines, the vertical pulse width Vpw of "2" lines, and the vertical back porch Vback of "33" lines are set.

Next, further example is given where the format code is "1" and the correction amount Ct is "1". In this case, values for extending the video data period by one pixel and one line more than the specified value are set to the timing parameter. Specifically, the horizontal front porch Hfront of "18" pixels, the horizontal pulse width Hpw of "94" pixels, and the horizontal back porch Hback of "47" pixels are set. Further, the vertical front porch Vfront of "10" lines, the vertical pulse width Vpw of "2" lines, and the vertical back porch Vback of "32" lines are set.

Note that, in the timing parameter table 247, only the timing parameter at the time when the correction amount Ct is "0" may be described for each format code. In this case, the timing control section 246 may read out the timing parameter before the correction from the timing parameter table 247, and shorten any of the read-out parameters by an amount corresponding to the correction amount Ct.

[Configuration Example of Timing Signal Generation Section]

Figure 9:
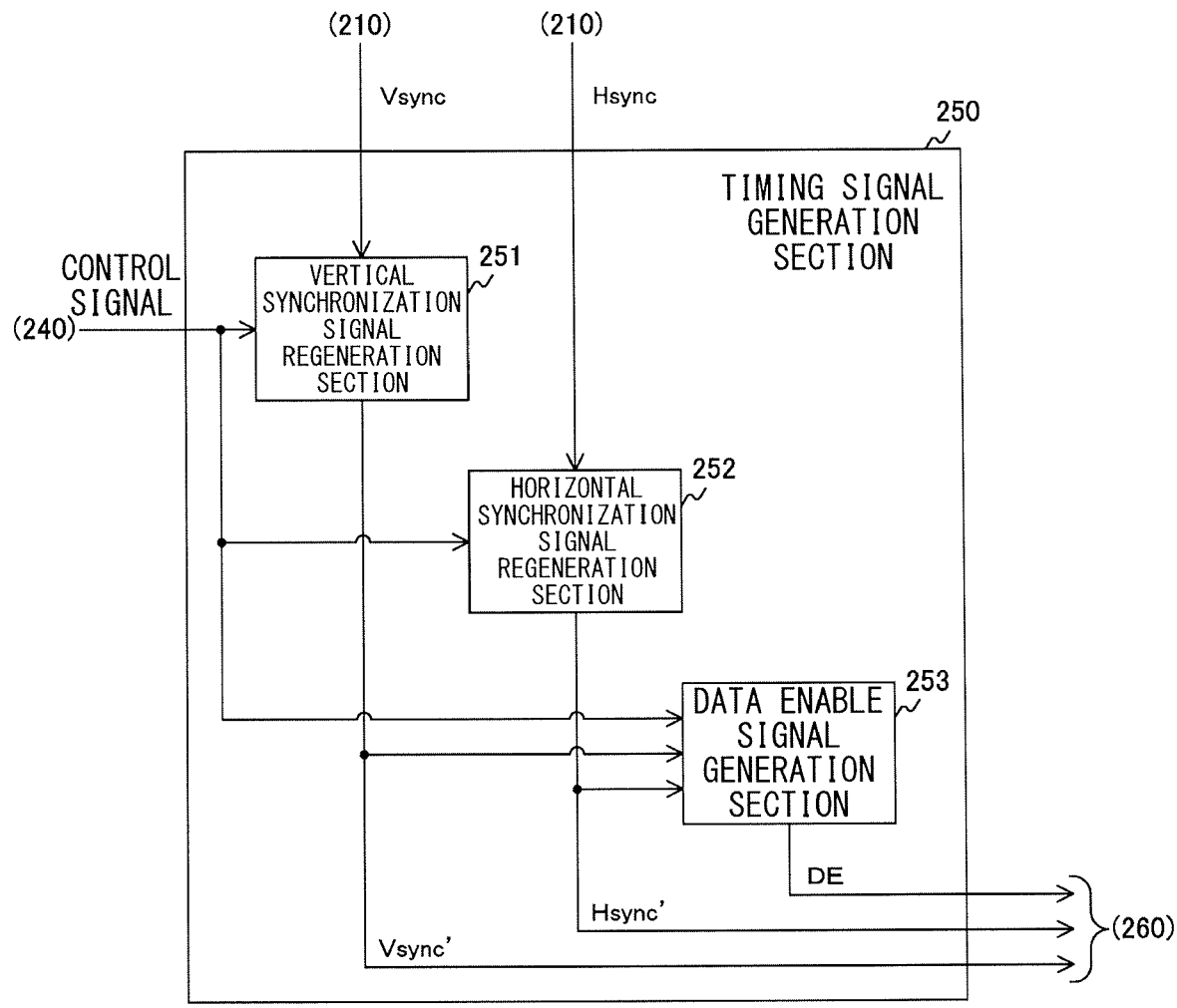
FIG. 9 is a block diagram illustrating one configuration example of a timing signal generation section according to the first embodiment.

FIG. 9 is a block diagram illustrating one configuration example of the timing signal generation section 250 according to the first embodiment. The timing signal generation section 250 includes a vertical synchronization signal regeneration section 251, a horizontal synchronization signal regeneration section 252, and a data enable signal generation section 253.

The vertical synchronization signal regeneration section 251 regenerates a vertical synchronization signal. The vertical synchronization signal regeneration section 251 changes a pulse width of the vertical synchronization signal Vsync in accordance with the control signal to regenerate the vertical synchronization signal. The vertical synchronization signal regeneration section 251 supplies the regenerated signal as a vertical synchronization signal Vsync' to the data enable signal generation section 253 and the HDMI transmission section 260.

The horizontal synchronization signal regeneration section 252 regenerates a horizontal synchronization signal. The horizontal synchronization signal regeneration section 252 changes a pulse width of the horizontal synchronization signal Hsync in accordance with the control signal to regenerate the horizontal synchronization signal. The horizontal synchronization signal regeneration section 252 supplies the regenerated signal as a horizontal synchronization signal Hsync' to the data enable signal generation section 253 and the HDMI transmission section 260.

The data enable signal generation section 253 generates the data enable signal DE. The data enable signal generation section 253 generates the data enable signal from the synchronization signal in accordance with the control signal.

The data enable signal generation section 253 supplies the generated data enable signal DE to the HDMI transmission section 260.

Figure 10:
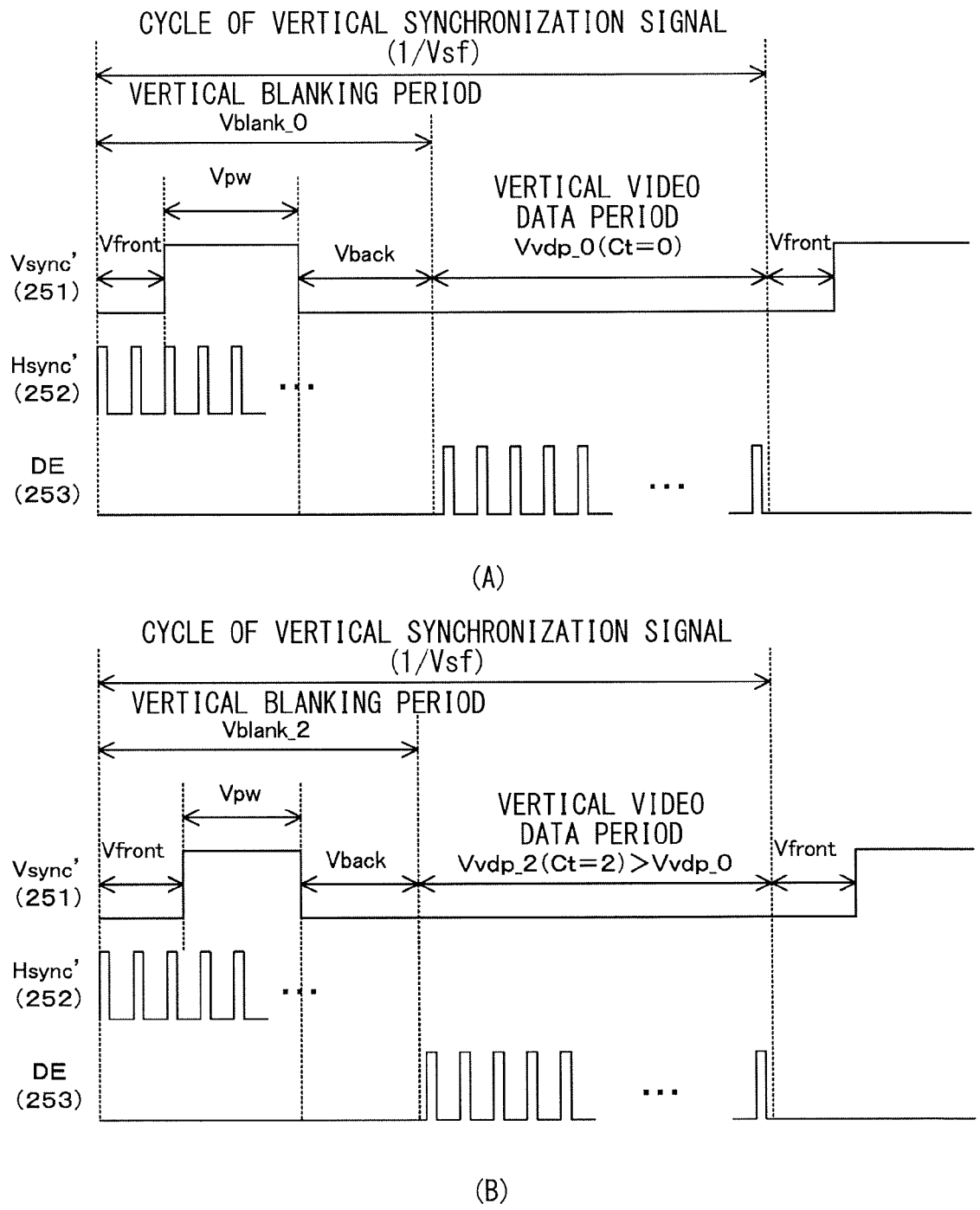
FIG. 10 illustrates one example of a vertical blanking period and a vertical video data period before and after the correction according to the first embodiment.

FIG. 10 illustrates one example of the vertical blanking period and the vertical video data period before and after the correction according to the first embodiment. A part (A) of FIG. 10 illustrates one example of a vertical blanking period Vblank_0 and a vertical video data period Vvdp_0 at the time when the correction amount Ct is "0". A period in a cycle (1/Vsf) of the vertical synchronization signal is divided into the vertical blanking period Vblank_0 and the vertical video data period Vvdp_0. The vertical blanking period Vblank_0 includes the vertical front porch Vfront, the pulse width Vpw of the vertical synchronization signal Vsync, and the vertical back porch Vback. Further, in the vertical video data period Vvdp_0, the data enable signal is set to active for the same number of times as the number of lines of an image.

A part (B) of FIG. 10 illustrates one example of a vertical blanking period Vblank_2 and a vertical video data period Vvdp_2 at the time when the correction amount Ct is "2". Through control of the timing parameter, the vertical blanking period Vblank_2 is shorter by two lines than the vertical blanking period Vblank_0 at the time when the correction amount Ct is "0". Therefore, the vertical video data period Vvdp_2 is longer by two lines than the vertical video data period Vvdp_0 at the time when the correction amount Ct is "0". Accordingly, even if an analog signal is unstable and the vertical video data period indicated by the vertical synchronization signal Vsync is deviated in the vertical direction from the period of valid pixel data, all of pixel data are transmitted as the valid pixel data as long as the deviation amount is smaller than or equal to two lines.

Figure 11:
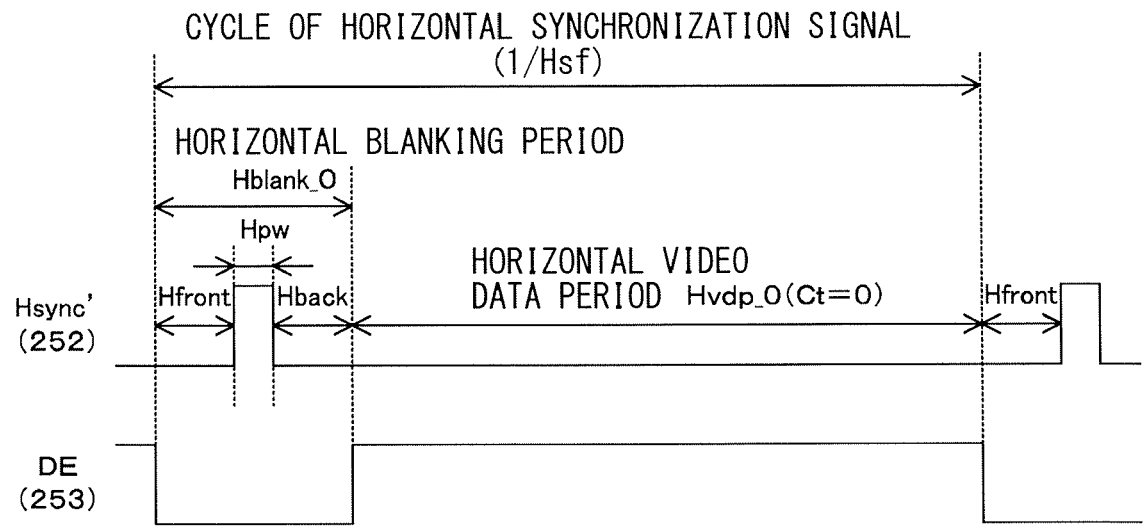
FIG. 11 illustrates one example of a horizontal blanking period and a horizontal video data period before and after the correction according to the first embodiment.
Figure 11:
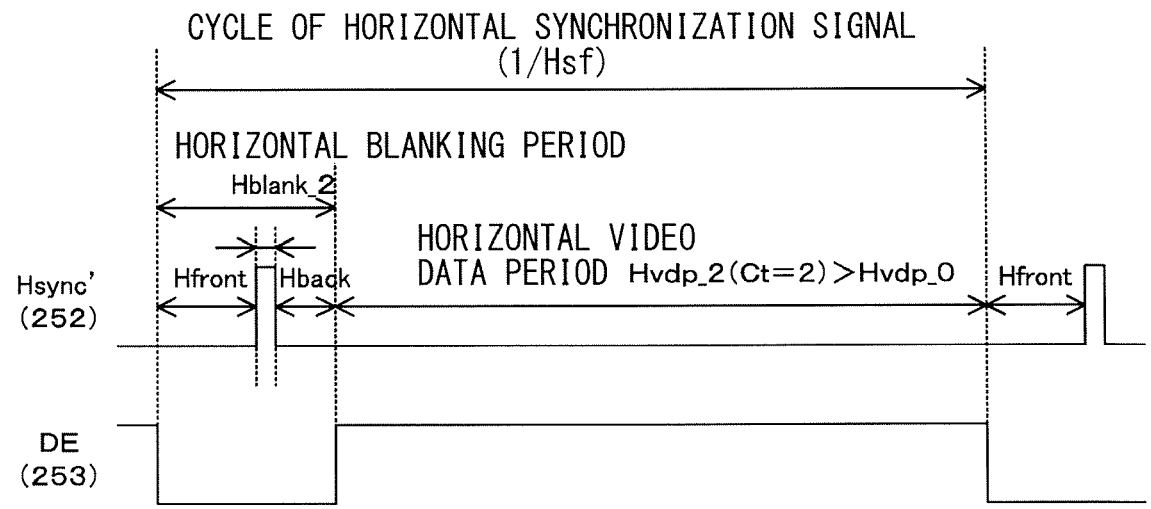

FIG. 11 illustrates one example of the horizontal blanking period and the horizontal video data period before and after the correction according to the first embodiment. A part (A) of FIG. 11 illustrates one example of a horizontal blanking period Hblank_0 and a horizontal video data period Hvdp_0 at the time when the correction amount Ct is "0". A period in a cycle (1/Hsf) of the horizontal synchronization signal is divided into the horizontal blanking period Hblank_0 and the horizontal video data period Hvdp_0. The horizontal blanking period Hblank_0 includes the horizontal front porch Hfront, the pulse width Hpw of the horizontal synchronization signal Hsync, and the horizontal back porch Hback. Further, in the horizontal video data period Hvdp_0, the data enable signal is set to active.

A part (B) of FIG. 11 illustrates one example of a horizontal blanking period Hblank_2 and a horizontal video data period Hvdp_2 at the time when the correction amount Ct is "2". Through control of the timing parameter, the horizontal blanking period Hblank_2 is shorter by two pixels than the horizontal blanking period Hblank_0 at the time when the correction amount Ct is "0". Therefore, the horizontal video data period Hvdp_2 is longer by two pixels than the horizontal video data period Hvdp_0 at the time when the correction amount Ct is "0". Accordingly, even if an analog signal is unstable and the horizontal video data period indicated by the horizontal synchronization signal Hsync is deviated in the horizontal direction from the period of valid pixel data, all of pixel data are transmitted as the valid pixel data as long as the deviation amount is smaller than or equal to two pixels.

[Configuration Example of Image Processing Circuit]

Figure 12:
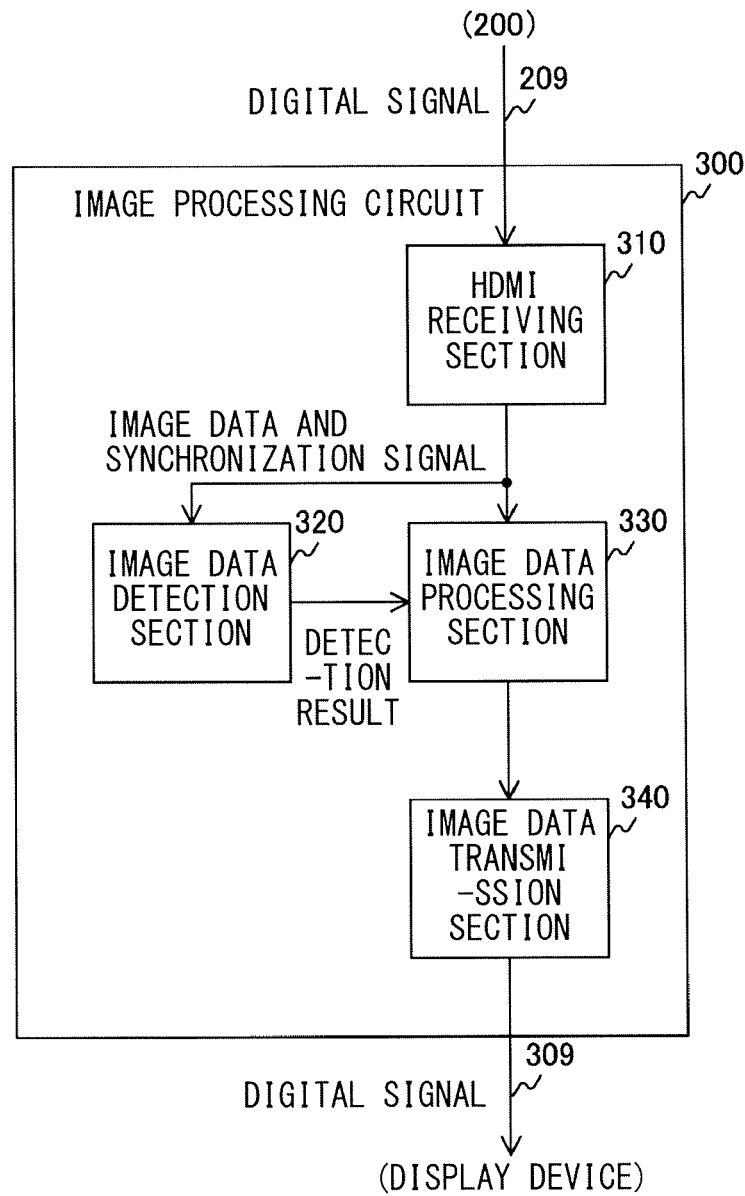
FIG. 12 is a block diagram illustrating one configuration example of an image processing circuit according to the first embodiment.

FIG. 12 is a block diagram illustrating one configuration example of the image processing circuit 300 according to the first embodiment. The image processing circuit 300 includes an HDMI receiving section 310, an image data detection section 320, an image data processing section 330, and an image data transmission section 340.

The HDMI receiving section 310 receives the image data and the timing signal in accordance with the standard of the HDMI. The HDMI receiving section 310 supplies, as valid data, the image data in the video data period indicated by the data enable signal DE in the timing signals to the image data detection section 320 and the image data processing section 330. In addition, the HDMI receiving section 310 supplies, as invalid data, data of fixed values in the blanking period indicated by the data enable signal DE to the image data detection section 320 and the image data processing section 330. The fixed value is a value below that of the valid pixel data, and is a value of a black level. Further, the HDMI receiving section 310 supplies the synchronization signal in the timing signals to the image data detection section 320 and the image data processing section 330.

The image data detection section 320 detects the valid pixel data, and supplies a detection result to the image data processing section 330. As a result of extending the video data period, the invalid pixel data of the black level is included in the video data period in addition to the valid pixel data from the image supply device 100. Therefore, the image data detection section 320 detects the valid pixel data in the video data period.

The image data detection section 320 may compare the value of the pixel data with the fixed value being a value of invalid data, for example, in the order corresponding to scanning of the pixel data. When the value of the pixel data is larger than the fixed value, the image data detection section 320 detects the pixel data as the valid pixel data. When the valid pixel data is detected in a certain line, the image data detection section 320 detects, as the valid pixel data, all of the pixel data that are from the detection timing up to timing at which the horizontal video data period specified by the format elapses. Further, the image data detection section 320 detects, as the invalid pixel data, all of the pixel data that are from the elapse of the horizontal video data period up to detection of the valid pixel data in the next line. From timing at which the valid pixel data is first detected up to timing at which the vertical video data period specified by the format elapses, the image data detection section 320 performs the same detection process for each line. Further, the image data detection section 320 detects, as the invalid pixel data, all of the pixel data that are from the elapse of the vertical video data period up to detection of the valid pixel data in the next image. The image data detection section 320 supplies a detection result to the image data processing section 330.

The image data processing section 330 performs predetermined image processing on an image including the valid pixel data detected by the image data detection section 320. The image data processing section 330 supplies the image data after the image processing and the synchronization signal to the image data transmission section 340.

The image data transmission section 340 transmits the digital signal including the image data and the synchronization signal to the display device 400 via an external interface with the display device 400. For example, the image data transmission section 340 may convert the digital signal into a signal in an external interface such as LVDS (Low Voltage Differential Signaling) or V-by-One, and output the thus-converted digital signal to the display device 400.

Figure 13:
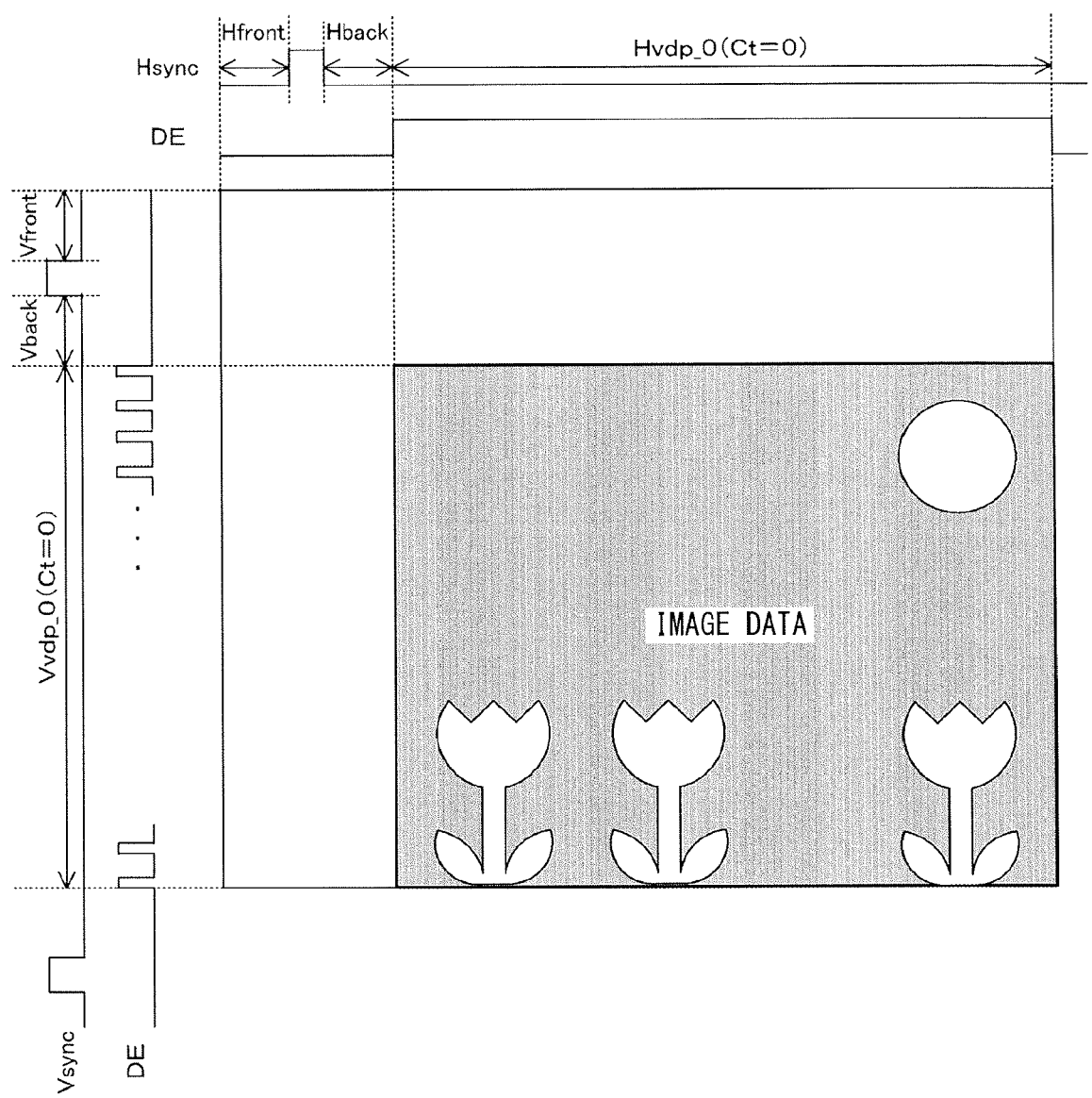
FIG. 13 illustrates one example of a synchronization signal and an image signal according to the first embodiment.

FIG. 13 illustrates one example of the synchronization signal and the image signal according to the first embodiment. FIG. 13 illustrates one example of the synchronization signal and the image signal in the case where the signal quality of the analog signal is sufficiently high. In FIG. 13, since the signal quality of the analog signal is high, the vertical video data period Vvdp obtained from the vertical synchronization signal Vsync' is assumed as being matched with a period in which the valid pixel data is inputted. Accordingly, it is unnecessary to extend the vertical video data period and the value of Vvdp_0 specified by the format is set. In this period, the data enable signal DE is set to active for the same number of times as the number of lines. Also in the horizontal video data period, the value of Hvdp_0 specified by the format is similarly set. In this period, the data enable signal DE is set to active. In accordance with the data enable signal DE, all of the valid image data are supplied to the image processing circuit 300, and the image processing is performed on all of the image data.

Figure 14:
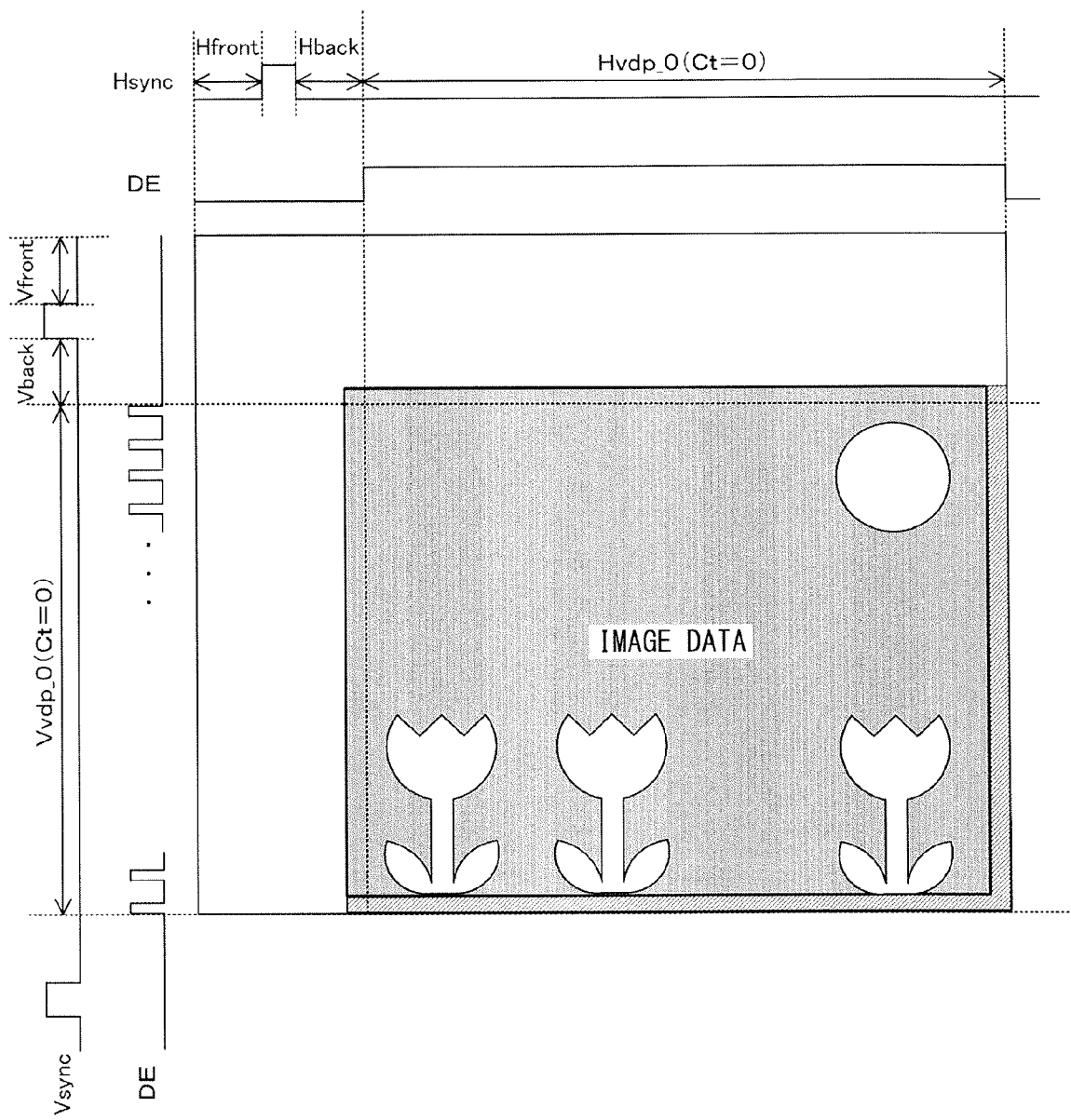
FIG. 14 illustrates one example of an image signal and a synchronization signal before the correction according to the first embodiment.

FIG. 14 illustrates one example of the image signal and the synchronization signal before the correction according to the first embodiment. In FIG. 14, since the signal quality of the analog signal is low, the vertical video data period Vvdp obtained from the vertical synchronization signal Vsync' is assumed as not being matched with the period in which the valid pixel data is inputted. Accordingly, if the Vvdp_0 specified by the format is set without extending the vertical video data period, the valid pixel data may be inputted when the data enable signal DE is inactive. Also in the horizontal video data period, when the Hvdp_0 specified by the format is set, the valid pixel data is similarly inputted when the data enable signal DE is inactive. As a result, a part of the image data is not supplied as the valid data to the image processing circuit 300, and the image processing is not performed on a part of the image data. As a result, a part of the image after the image processing is omitted.

Figure 15:
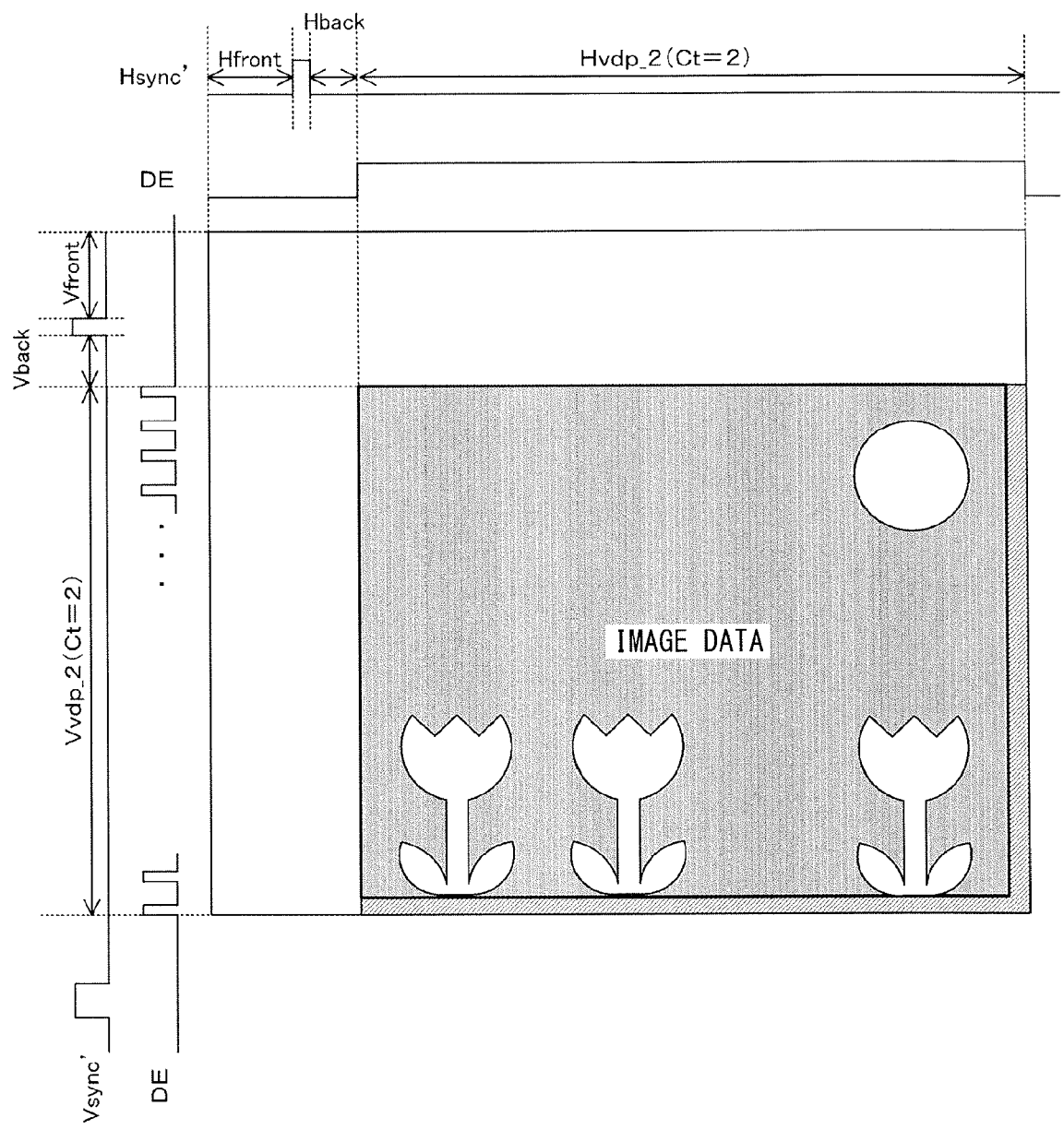
FIG. 15 illustrates one example of an image signal and a synchronization signal after the correction according to the first embodiment.

FIG. 15 illustrates one example of the image signal and the synchronization signal after the correction according to the first embodiment. Also in FIG. 15, since the signal quality of the analog signal is low, the vertical video data period Vvdp obtained from the vertical synchronization signal Vsync' is assumed as not being matched with the period in which the valid pixel data is inputted, as in FIG. 14. In this case, by extending the vertical video data period, the Vvdp_2 that is longer than the Vvdp_0 specified by the format is set. Thereby, the valid pixel data is prevented from being inputted when the data enable signal DE is inactive. As for the horizontal video data period, the Hvdp_2 that is longer than the Hvdp_0 specified by the format is likewise set. Thereby, the valid pixel data is prevented from being inputted when the data enable signal DE is inactive. As a result, all of the image data are supplied as the valid data to the image processing circuit 300, and omission of a part of the image after the image processing is prevented.

By making the video data period longer than the specified value, the invalid pixel data of the black level is included in the video data period. However, in general, the data of the black level in the video data period does not have a certain value due to an influence of noise in a transmission path from the image supply device 100 to the image processing circuit 300. Therefore, even if a position adjustment is performed in the display device 400 up to an extent in which the black level appears, a noisy black level is displayed as a picture rather than a certain unnatural black level.

It is to be noted that when the video data period is made longer than the specified value, power consumption may rise up, or time (delay time) taken for completion of an arithmetic operation of the image data detection section 320 or the image data processing section 330 may increase. However, the A/D conversion circuit 200 dynamically extends the video data period according to the resolution and the signal quality as described above, so that the extension of the video data period is suppressed when unnecessary. Accordingly, it is possible to keep to the minimum occasions, where a disadvantage such as increase in the power consumption occurs due to the extension of the video data period.

[Operation Example of Image Processing Device]

Figure 16:
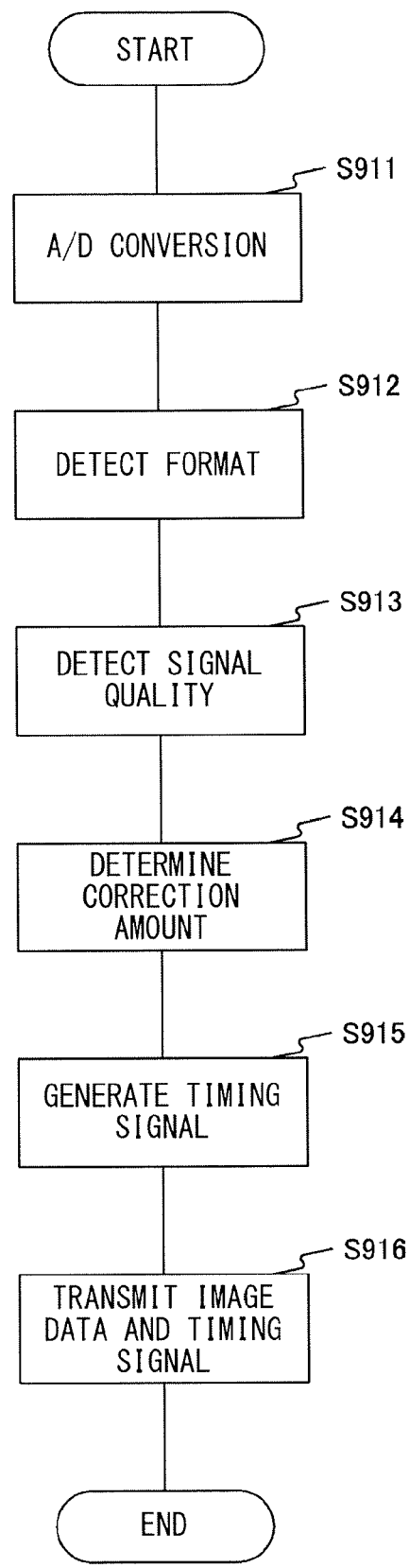
FIG. 16 is a flowchart illustrating one example of an A/D conversion process according to the first embodiment.

FIG. 16 is a flowchart illustrating one example of the A/D conversion process according to the first embodiment. This A/D conversion process may be started, for example, when the analog signal is inputted to the A/D conversion circuit 200.

The A/D conversion circuit 200 performs the A/D conversion on the analog signal (Step S911). The A/D conversion circuit 200 detects a format of the resolution from the synchronization signal, and acquires timing of the start and timing of the end of the video data period (Step S912). Further, the A/D conversion circuit 200 detects the signal quality of the synchronization signal (Step S913). The A/D conversion circuit 200 determines the correction amount Ct on the basis of the format and the signal quality (Step S914). Further, the A/D conversion circuit 200 generates the timing signal indicating the display period extended in accordance with the correction amount Ct (Step S915). The A/D conversion circuit 200 transmits the image data and the timing signal to the image processing circuit 300 (Step S916).

Figure 17:
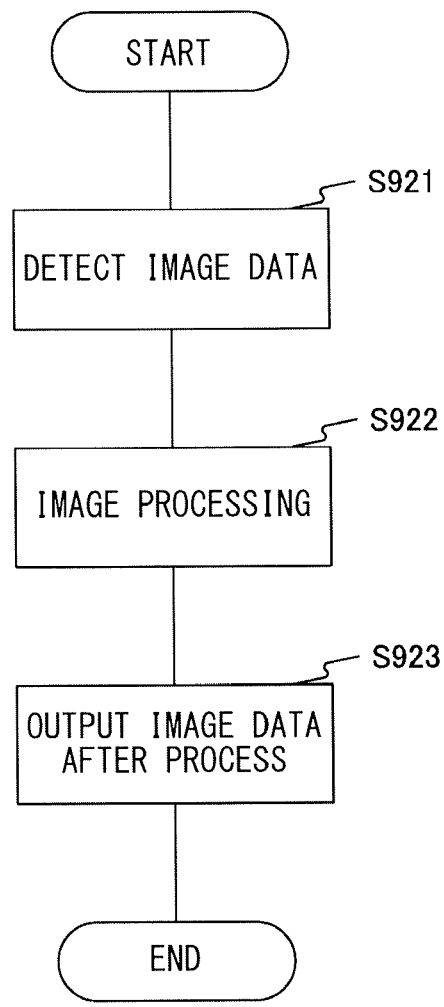
FIG. 17 is a flowchart illustrating one example of image processing according to the first embodiment.

FIG. 17 is a flowchart illustrating one example of the image processing according to the first embodiment. This image processing may be started, for example, when the image processing circuit 300 receives the image data and the timing signal from the A/D conversion circuit 200.

The image processing circuit 300 detects the image data supplied by the image supply device 100 in the video data period (Step S921). Further, the image processing circuit 300 performs the predetermined image processing on the detected image data (Step S922). The image processing circuit 300 outputs the image data after the image processing to the display device 400 (Step S923).

As described above, according to the first embodiment of the present technology, the timing different from the specified timing is set to extend the video data period. Thereby, all of pixel data are outputted as the valid data in the video data period. Therefore, the image processing is performed to all of the pixel data, making it possible to prevent a part of an image after the image processing from being omitted.

2. Second Embodiment

[Configuration Example of A/D conversion Circuit]

In the first embodiment, the measured value of the signal quality is used to obtain the correction amount of the video data period. However, the measured value may also be used to control the image processing circuit 300. The A/D conversion circuit 200 according to a second embodiment differs from that according to the first embodiment in that the measured value of the signal quality is used to control the image processing circuit 300.

Figure 18:
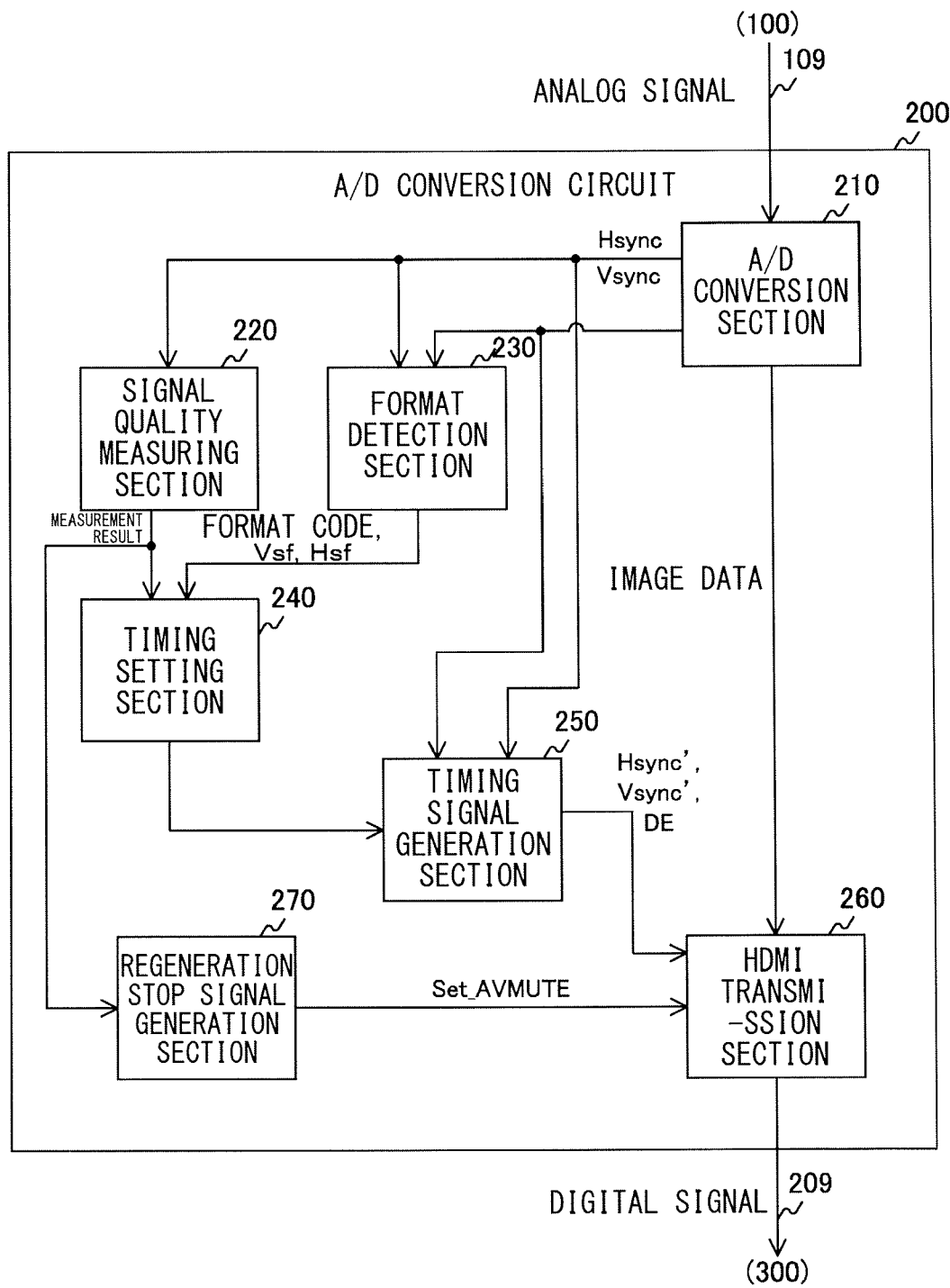
FIG. 18 is a block diagram illustrating one configuration example of an A/D conversion circuit according to a second embodiment.

FIG. 18 is a block diagram illustrating one configuration example of the A/D conversion circuit 200 according to the second embodiment. The A/D conversion circuit 200 according to the second embodiment differs from that of the first embodiment in that a regeneration stop signal generation section 270 is further included.

The regeneration stop signal generation section 270 generates a regeneration stop signal on the basis of the measured value of the signal quality. The regeneration stop signal instructs the image processing circuit 300 to stop outputting image-processed data. When the image processing circuit 300 stops the output, regeneration of the image data is stopped in the display device 400. When the measured value of the signal quality is smaller than a predetermined threshold, the regeneration stop signal generation section 270 generates the regeneration stop signal. For example, a signal including Set_AVMute information in the standard of the HDMI may be generated as the regeneration stop signal. The regeneration stop signal generation section 270 supplies the generated regeneration stop signal to the HDMI transmission section 260.

The HDMI transmission section 260 according to the second embodiment further transmits a data island packet including the regeneration stop signal in the blanking period. The image processing circuit 300 according to the second embodiment stops the output of the image data in accordance with the regeneration stop signal.

FIG. 19 illustrates one example of a data configuration of the data island packet according to the second embodiment. In a payload of the data island packet, data of one byte from SB0 to SB6 is stored. In 0-th bit of the SB0, the Set_AVMute information about a value of "1" is stored. When the Set_AVMute information is not stored, a value of "0" is set in the 0-th bit and a value of "1" is set in the 4-th bit.

As described above, according to the second embodiment, the A/D conversion circuit 200 generates the regeneration stop signal when the signal quality is lower than a threshold. Therefore, output of an image is stopped without any delay when the signal quality is reduced. Normally, the image processing circuit 300 monitors the signal quality and generates the regeneration stop signal. The A/D conversion circuit 200 in an upstream of the image processing circuit 300 detects reduction in the signal quality and stops the output of the image. Thereby, as compared to a configuration in which the detection is performed by the image processing circuit 300, it is possible to reduce a delay time from the reduction in the signal quality up to a stop of the output.

Further, because the regeneration stop signal is transmitted via an existing HDMI interface, it is unnecessary to newly provide a signal line, etc. for transmitting the regeneration stop signal. Therefore, implementation is possible at low cost.

Note that the aforementioned embodiments are shown as some examples of embodying the present technology, and there is a correspondence between the matters in the above-described embodiments and elements in the appended claims. Likewise, there is a correspondence between the elements of the appended claims and the matters having the same names in the above-described embodiments of the present technology. The present technology, however, is not limited to the above-described embodiments, and may be embodied by making various modifications to the embodiments without departing from the gist of the technology.

Further, the procedures described in each of the aforementioned embodiments may be regarded as a method including a series of these procedures, or may be regarded as a program for causing a computer to execute the series of these procedures or a recording medium storing the program therein. As the recording medium, for example, a CD (a Compact Disc), an MD (a MiniDisc), a DVD (a Digital Versatile Disk), a memory card, or Blu-ray Disc (registered trademark) can be used.

Furthermore, the technology encompasses any possible combination of some or all of the various embodiments described herein and incorporated herein.

It is possible to achieve at least the following configurations from the above-described example embodiments of the disclosure.

(1) A conversion circuit, including:
    a conversion section configured to convert each of analog pixel signals into digital pixel data;
    a timing acquisition section configured to acquire specified timing, the specified timing defining a display period during which display of each of the analog pixel signals is performed in a cycle of a synchronization signal;
    a timing setting section configured to set timing that defines an extension period that is longer than the display period, the timing being other than the specified timing;
    an enable signal generation section configured to generate an enable signal, the enable signal indicating the extension period as a period during which the digital pixel data is valid; and
    an output section configured to output the digital pixel data that is valid, in accordance with the enable signal.

(2) The conversion circuit according to (1), further including a signal quality measuring section configured to measure signal quality of the synchronization signal,
    wherein the timing setting section sets the timing that defines the longer extension period as the signal quality is lower.

(3) The conversion circuit according to (2), further including a regeneration stop signal generation section configured to generate a regeneration stop signal, the regeneration stop signal instructing stop of regeneration of the digital pixel data when the signal quality is lower than a predetermined value,
    wherein the output section further outputs the regeneration stop signal.

(4) The conversion circuit according to any one of (1) to (3), wherein the timing setting section acquires resolution of an image that is structured by the analog pixel signals, and sets the timing that defines the longer extension period as the resolution is lower.

(5) The conversion circuit according to any one of (1) to (4), wherein
    the timing acquisition section acquires the specified timing, based on a specified pulse width that is specified as a pulse width of the synchronization signal, and
    the timing setting section sets the timing that defines the extension period, based on a pulse width that is different from the specified pulse width.

(6) The conversion circuit according to any one of (1) to (5), wherein
    the timing acquisition section acquires the specified timing, based on a specified back porch, the specified back porch being specified as a period from a time point at which the synchronization signal changes up to timing at which the display period starts, and
    the timing setting section sets the timing that defines the extension period, based on a period that is different from the specified back porch.

(7) The conversion circuit according to any one of (1) to (6), wherein
    the timing acquisition section acquires the specified timing, based on a specified front porch, the specified front porch being specified as a period from timing at which the display period ends up to a time point at which the synchronization signal changes, and the timing setting section sets the timing that defines the extension period, based on a period that is different from the specified front porch.

(8) An image processing device, including:
- a conversion section configured to convert each of analog pixel signals into digital pixel data;
- a timing acquisition section configured to acquire specified timing, the specified timing defining a display period during which display of each of the analog pixel signals is performed in a cycle of a synchronization signal;
- a timing setting section configured to set timing that defines an extension period that is longer than the display period, the timing being other than the specified timing;
- an enable signal generation section configured to generate an enable signal, the enable signal indicating the extension period as a period during which the digital pixel data is valid;
- an output section configured to output the digital pixel data that is valid, in accordance with the enable signal; and
- an image processing section configured to perform predetermined image processing on the digital pixel data that is outputted.

(9) A method of controlling a conversion circuit, the method including:
- converting, through a conversion section, each of analog pixel signals into digital pixel data;
- acquiring, through a timing acquisition section, specified timing, the specified timing defining a display period during which display of each of the analog pixel signals is performed in a cycle of a synchronization signal;
- setting, through a timing setting section, timing that defines an extension period that is longer than the display period, the timing being other than the specified timing;
- generating, through an enable signal generation section, an enable signal, the enable signal indicating the extension period as a period during which the digital pixel data is valid; and
- outputting, through an output section, the digital pixel data that is valid, in accordance with the enable signal.

It should be understood by those skilled in the art that various modifications, combinations, sub-combinations and alterations may occur depending on design requirements and other factors insofar as they are within the scope of the appended claims or the equivalents thereof.

What is claimed is:

1. A conversion circuit, comprising:
a conversion section configured to convert each of analog pixel signals into digital pixel data;
a timing acquisition section configured to acquire specified timing, the specified timing defining a display period in a cycle of a synchronization signal;
a timing setting section configured to set timing in which the display period is extended to define an extended display period in the cycle of the synchronization signal without changing the cycle of the synchronization signal, wherein display of each of the analog pixel signals is performed during the extended display period and wherein the extended display period is longer than the display period, the timing being other than the specified timing;
an enable signal generation section configured to generate an enable signal, the enable signal indicating the extended display period as a period during which the digital pixel data is valid; and
an output section configured to output the digital pixel data that is valid, in accordance with the enable signal.

2. The conversion circuit according to claim 1, further comprising a signal quality measuring section configured to measure signal quality of the synchronization signal,
wherein the timing setting section sets the timing that defines the longer extended display period as the signal quality is lower.

3. The conversion circuit according to claim 2, further comprising a regeneration stop signal generation section configured to generate a regeneration stop signal, the regeneration stop signal instructing stop of regeneration of the digital pixel data when the signal quality is lower than a predetermined value,
wherein the output section further outputs the regeneration stop signal.

4. The conversion circuit according to claim 1, wherein the timing setting section acquires resolution of an image that is structured by the analog pixel signals, and sets the timing that defines the longer extended display period as the resolution is lower.

5. The conversion circuit according to claim 1, wherein
the timing acquisition section acquires the specified timing, based on a specified pulse width that is specified as a pulse width of the synchronization signal, and
the timing setting section sets the timing that defines the extended display period, based on a pulse width that is different from the specified pulse width.

6. The conversion circuit according to claim 1, wherein
the timing acquisition section acquires the specified timing, based on a specified back porch, the specified back porch being specified as a period from a time point at which the synchronization signal changes up to timing at which the display period starts, and
the timing setting section sets the timing that defines the extended display period, based on a period that is different from the specified back porch.

7. The conversion circuit according to claim 1, wherein
the timing acquisition section acquires the specified timing, based on a specified front porch, the specified front porch being specified as a period from timing at which the display period ends up to a time point at which the synchronization signal changes, and
the timing setting section sets the timing that defines the extended display period, based on a period that is different from the specified front porch.

8. An image processing device, comprising:
a conversion section configured to convert each of analog pixel signals into digital pixel data;
a timing acquisition section configured to acquire specified timing, the specified timing defining a display period in a cycle of a synchronization signal;
a timing setting section configured to set timing in which the display period is extended to define an extended display period in the cycle of the synchronization signal without changing the cycle of the synchronization signal, wherein display of each of the analog pixel signals is performed during the extended display period and wherein the extended display period is longer than the display period, the timing being other than the specified timing;
an enable signal generation section configured to generate an enable signal, the enable signal indicating the extended display period as a period during which the digital pixel data is valid;
an output section configured to output the digital pixel data that is valid, in accordance with the enable signal; and an image processing section configured to perform predetermined image processing on the digital pixel data that is outputted.

9. A method of controlling a conversion circuit, the method comprising:
   converting, through a conversion section, each of analog pixel signals into digital pixel data;
   acquiring, through a timing acquisition section, specified timing, the specified timing defining a display period in a cycle of a synchronization signal;
   setting, through a timing setting section, timing in which the display period is extended to define an extended display period in the cycle of the synchronization signal without changing the cycle of the synchronization signal, wherein display of each of the analog pixel signals is performed during the extended display period and wherein the extended display period is longer than the display period, the timing being other than the specified timing;
   generating, through an enable signal generation section, an enable signal, the enable signal indicating the extended display period as a period during which the digital pixel data is valid; and
   outputting, through an output section, the digital pixel data that is valid, in accordance with the enable signal.

* * * * *